US009585073B2

United States Patent
Kitaji

(10) Patent No.: US 9,585,073 B2
(45) Date of Patent: *Feb. 28, 2017

(54) RADIO RELAY STATION AND CONTROL METHOD

(71) Applicant: KYOCERA CORPORATION, Kyoto (JP)

(72) Inventor: Mitsuhiro Kitaji, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/010,492

(22) Filed: Jan. 29, 2016

(65) Prior Publication Data
US 2016/0150452 A1 May 26, 2016

Related U.S. Application Data

(63) Continuation of application No. 13/575,583, filed as application No. PCT/JP2011/051470 on Jan. 26, 2011.

(30) Foreign Application Priority Data

Jan. 26, 2010 (JP) .................................. 2010-014693
Jan. 26, 2010 (JP) .................................. 2010-014696

(51) Int. Cl.
*H04W 36/14* (2009.01)
*H04W 36/08* (2009.01)
(Continued)

(52) U.S. Cl.
CPC ........ *H04W 36/14* (2013.01); *H04B 7/15592* (2013.01); *H04W 36/0016* (2013.01);
(Continued)

(58) Field of Classification Search
CPC . H04W 36/22; H04W 36/0005; H04W 36/08; H04W 36/00; H04W 36/0055;
(Continued)

(56) References Cited

U.S. PATENT DOCUMENTS 7,010,329 B2   3/2006  Livet et al.
7,869,808 B2   1/2011  Kojima
(Continued)

FOREIGN PATENT DOCUMENTS

JP   2000-138627 A   5/2000
JP   2002-190770 A   7/2002
(Continued)

OTHER PUBLICATIONS

International Search Report; PCT/JP2011/051470; Mar. 22, 2011.
(Continued)

*Primary Examiner* — Andrew Chriss
*Assistant Examiner* — Rasha Fayed
(74) *Attorney, Agent, or Firm* — Studebaker & Brackett PC

(57) ABSTRACT

When a relay station load, which is the load of communications with radio terminals (300E-300G), of a relay node (200) exceeds a load allowable amount, which is determined according to the load of a radio base station (100A), the relay node transmits a handover request, which requests permission for a relay handover, to the radio base station (100A) and performs a relay handover if the relay node receives a handover command which instructs a relay handover.

2 Claims, 13 Drawing Sheets

(51) Int. Cl.
*H04B 7/155* (2006.01)
*H04W 36/00* (2009.01)
*H04W 36/22* (2009.01)
*H04W 84/04* (2009.01)

(52) U.S. Cl.
CPC ........ *H04W 36/08* (2013.01); *H04W 36/0005* (2013.01); *H04W 36/22* (2013.01); *H04W 84/047* (2013.01)

(58) Field of Classification Search
CPC ... H04W 88/04; H04W 84/047; H04W 84/04; H04W 4/00; H04W 40/22; H04W 28/08; H04B 7/155; H04B 7/26; H04B 7/2606; H04B 17/40; H04B 3/36; H04B 1/60; H04L 47/824; H04L 47/724; H04L 47/11; H04L 47/781; H04L 47/822; H04L 47/783; H04L 12/5695
USPC ................. 370/315, 331–334; 455/7, 436, 9
See application file for complete search history.

(56) References Cited

U.S. PATENT DOCUMENTS

| | | | |
|---|---|---|---|
| 7,991,400 | B2 | 8/2011 | Ito et al. |
| 8,903,394 | B2 | 12/2014 | Shen et al. |
| 2004/0180701 | A1 | 9/2004 | Livet et al. |
| 2005/0233753 | A1 | 10/2005 | Hamabe et al. |
| 2007/0086387 | A1* | 4/2007 | Kang ........... H04B 7/2606 370/331 |
| 2007/0104148 | A1* | 5/2007 | Kang ............. H04W 4/08 370/331 |
| 2007/0232311 | A1* | 10/2007 | Kuhn ............. H04W 36/22 455/436 |
| 2007/0249347 | A1 | 10/2007 | Saifullah et al. |
| 2008/0013558 | A1 | 1/2008 | Ito et al. |
| 2008/0181176 | A1* | 7/2008 | Lee ........... H04W 36/0055 370/331 |
| 2008/0232296 | A1* | 9/2008 | Shin ............. H04B 7/2606 370/315 |
| 2009/0047970 | A1 | 2/2009 | Kim et al. |
| 2010/0142405 | A1* | 6/2010 | Cai .............. H04W 36/30 370/254 |
| 2010/0173644 | A1 | 7/2010 | Koyanagi |
| 2011/0053598 | A1* | 3/2011 | Ahluwalia ........ H04W 36/22 455/436 |
| 2012/0002589 | A1 | 1/2012 | Saifullah et al. |

FOREIGN PATENT DOCUMENTS

| | | |
|---|---|---|
| JP | 2006-520170 A | 8/2006 |
| JP | 2006-311253 A | 11/2006 |
| JP | M07-116697 A | 5/2007 |
| JP | 2008-022089 A | 1/2008 |
| JP | 2008-187688 A | 8/2008 |
| JP | 009-049974 A | 3/2009 |
| JP | 2009-267708 A | 11/2009 |
| WO | 2008/124987 A1 | 10/2008 |
| WO | 2009/050794 A1 | 4/2009 |

OTHER PUBLICATIONS

3GPP TR 36.814 V0.4.1 (Feb. 2009); 3rd Generation Partnership Project; Technical Specification Group Radio Access Network; Further Advancements for E-UTRA Physical Layer Aspects (Release 9).

Huawei; "X2 interface analysis for relay"; 3GPP TSG RAN WG3 #65bis; R3-092190; Oct. 12-15, 2009; Miyazaki, Japan.

Nokia Siemens Networks; "A necessary procedure to negotiate HO setting for SON load balancing"; 3GPP TSG RAN WG3 Meeting #65; R3-091921; Aug. 24-28, 2009; Shenzhen, China.

Motorola; "Load balancing scheme and X2 message support"; 3GPP TSG RAN3 #59; R3-080393; Feb. 11-15, 2008; Sorrento, Italy.

Nortel; "Discussion on Load Balancing"; 3GPP TSG-RAN WG3 Meeting #59bis; R3-080857; Mar. 31-Apr. 3, 2008; Shenzhen, China.

Motorola; "Load balancing scheme and X2 message support"; 3GPP TSG-RAN3 #59bis; R3-080865; Mar. 31-Feb. 3, 2008; Shenzhen, China.

An Office Action; "Notice of Reason for Rejection," issued by the Japanese Patent Office on Dec. 24, 2013, which corresponds to Japanese Patent Application No. 2010-014693 and is related to U.S. Appl. No. 13/575,583; with English language statement of relevance.

An Office Action; "Notice of Reason for Rejection," issued by the Japanese Patent Office on Dec. 24, 2013, which corresponds to Japanese Patent Application No. 2010-014696 and is related to U.S. Appl. No. 13/575,583; with English language statement of relevance.

An Office Action; "Notice of Reasons for Rejection," issued by the Japanese Patent Office on Apr. 8, 2014, which corresponds to Japanese Patent Application No. 2014-032782 and is related to U.S. Appl. No. 13/575,583; with English language statement of relevance.

\* cited by examiner

RADIO RELAY STATION AND CONTROL METHOD

TECHNICAL FIELD

The present invention relates to a radio relay station and a control method for implementing relay transmission.

BACKGROUND ART

A radio communication system of the next generation to implement higher-speed communications than the currently-operated 3rd generation and 3.5th generation radio communication systems includes LTE (Long Term Evolution) standardized by the 3GPP (3rd Generation Partnership Project), which is the standardization organization for the radio communication systems. The LTE-advanced in which the LTE is advanced is planned to employ relay transmission using a radio relay station referred to as a relay node (see, for example, non-patent literature 1).

The radio relay station is a relay base station with a small output, which can be connected to a radio base station (a macro base station) via a radio link. A radio terminal connected to the radio relay station communicates with the radio base station via the radio relay station. The installation of a radio relay station in a cell edge, coverage hole or the like of the radio base station makes it possible for a radio terminal to perform communications under better conditions by indirectly communicating with the radio base station via the radio relay station, than by directly communicating with the radio base station.

CITATION LIST

Non-Patent Literature

Non-patent literature 1: 3GPP TR 36.814 V0.4.1, Chapter 9, "Relaying functionality", February 2009

SUMMARY OF THE INVENTION

Since a radio relay station relays communications between a radio base station (or another radio relay station) and a radio terminal, a communication capacity between the radio terminal and the radio base station depends on a communication capacity between the radio base station and the radio relay station. For this reason, when a load in a connection destination of the radio relay station is high (for example, when an amount of traffic to be handled by the radio base station is large), the communication capacity between the connection destination of the radio relay station and the radio relay station is small. In this case, the communication capacity between the radio relay station and the radio terminal is also small.

Accordingly, when a load in the connection destination of the radio relay station is high, the radio terminal connected to the radio relay station has a problem that a throughput is lowered even when a radio quality with the radio relay station is satisfactory.

For this reason, an objective of the present invention is to provide a radio relay station and a control method, which can improve a throughput of the radio terminal by performing proper load balancing.

The present invention has the following features to solve the problems described above. A first feature of the present invention is summarized as follows. A radio relay station (relay node 200), comprises: a first communication unit (first communication unit 210) configured to communicate with a radio base station (radio base station 100A) or a different radio relay station as a connection destination; a second communication unit (second communication unit 220) configured to communicate with at least one radio terminal (e.g. radio terminals 300E to 300G); a relay unit (relay unit 230) configured to relay data to be exchanged between the connection destination of the first communication unit and the radio terminal; and a controller (controller 240) configured to control the first communication unit and the second communication unit, wherein the controller comprises: a handover request unit (handover request unit 242) configured to control the first communication unit so that the first communication unit transmits a handover request for executing a relay station handover in which the first communication units switches the connection destination, when a relay station load that is a load of a communication performed by the second communication unit with the radio terminal exceeds a load allowable amount determined according to a load of the connection destination of the first communication unit or when it is predicted that the relay station load exceeds the load allowable amount; and a handover controller (handover controller 243) configured to control the first communication unit so that the first communication unit executes the relay station handover when the first communication unit receives a response message indicating that the relay station handover is allowed or instructed.

A second feature of the present invention relates to the first feature and is summarized as follows. The handover request unit controls the first communication unit so that the first communication unit transmits the handover request containing relay station load information indicating the relay station load.

A third feature of the present invention relates to the first feature and is summarized as follows. The handover request unit controls the first communication unit so that the first communication unit transmits the handover request to a relay station handover candidate which is a candidate of a new connection destination of the first communication unit.

A fourth feature of the present invention relates to the first feature and is summarized as follows. The controller further comprises: a notification request unit (notification request unit 245) configured to control the first communication unit so that the first communication unit transmits a load notification request for requesting a load notification notifying a load of a relay station handover candidate which is a candidate of a new connection destination of the first communication unit; and a connection destination determination unit (handover target determination unit 246) configured to determine a new connection destination of the first communication unit based on the load notification received by the first communication unit, wherein the handover request unit controls the first communication unit so that the first communication unit transmits the handover request to the new connection destination determined by the destination determination unit.

A fifth feature of the present invention relates to the fourth feature and is summarized as follows. The connection destination determination unit determines, as the new connection destination, a relay station handover candidate having the smallest load or a smaller load than a predetermined amount among the relay station handover candidates based on the load notification.

A sixth feature of the present invention relates to the fourth feature and is summarized as follows. The first communication unit measures a reception quality of a received radio signal, and the connection destination determination unit determines the new connection destination of the first communication unit based on the load notification and the radio quality.

A seventh feature of the present invention relates to the fourth feature and is summarized as follows. The controller further comprises: a notification request unit (notification request unit 245) configured to control the first communication unit so that the first communication unit transmits a load notification request for requesting a load notification notifying a load of a relay station handover candidate being a candidate of a new connection destination of the first communication unit; and a handover determination unit (handover determination unit 249) configured to determine whether or not to execute the relay station handover based on the load notification received by the first communication unit, wherein when the relay station load exceeds the load allowable amount or when it is predicted that the relay station load exceeds the load allowable amount, and when it is determined that the relay station handover is to be executed, the handover request unit controls the first communication unit so that the first communication unit transmits the handover request.

An eighth feature of the present invention relates to the seventh feature and is summarized as follows. The handover determination unit calculates a load of the relay station handover candidate that the relay station handover candidate may have if the relay station handover to the relay station handover candidate is executed, based on the load notification and the relay station load, and determines whether or not to execute the relay station handover based on the calculated load.

A ninth feature of the present invention relates to the first feature and is summarized as follows. When the first communication unit switches the connection destination by the relay station handover, the relay unit relays data to be exchanged between the new connection destination of the first communication unit and the radio terminal.

A tenth feature of the present invention is summarized as follows. A control method for a radio relay station which comprises a first communication unit configured to communicate with a radio base station or a different radio relay station as a connection destination, a second communication unit configured to communicate with at least one radio terminal, and a relay unit configured to relay data to be exchanged between the connection destination of the first communication unit and the radio terminal, the control method comprises: controlling the first communication unit so that the first communication unit transmits a handover request for executing a relay station handover in which the first communication units switches the connection destination, when a relay station load that is a load of a communication performed by the second communication unit with the radio terminal exceeds a load allowable amount determined according to a load of the connection destination of the first communication unit or when it is predicted that the relay station load exceeds the load allowable amount, and controlling the first communication unit so that the first communication unit executes the relay station handover when the first communication unit receives a response message indicating that the relay station handover is allowed or instructed.

An eleventh feature of the present invention is summarized as follows. A radio relay station (relay node 200), comprises: a first communication unit (first communication unit 210) configured to communicate with a radio base station (radio base station 100A) or a different radio relay station as a connection destination; a second communication unit (second communication unit 220) configured to communicate with at least one radio terminal (e.g. radio terminals 300E to 300G); a relay unit (relay unit 230) configured to relay data to be exchanged between a connection destination of the first communication unit and the radio terminal; and a controller (controller 240) configured to control the first communication unit and the second communication unit, wherein the controller comprises: a handover request unit (handover request unit 242) configured to control the first communication unit so that the first communication unit transmits a handover request for executing a terminal handover for switching a connection destination, when a relay station load that is a load of a communication performed by the second communication unit with the radio terminal exceeds a load allowable amount determined according to a load of a connection destination of the first communication unit or when it is predicted that the relay station load exceeds the load allowable amount; and a handover instruction unit (handover instruction unit 244) configured to control the second communication unit, when the first communication unit receives a response message indicating that the terminal handover is allowed or instructed, so that the second communication unit transmits a terminal handover instruction corresponding to the received response message to the radio terminal.

A twelfth feature of the present invention relates to the eleventh feature and is summarized as follows. The handover request unit controls the first communication unit so that the first communication unit transmits the handover request containing terminal load information indicating a terminal load that is a load of each radio terminal.

A thirteenth feature of the present invention relates to the eleventh feature and is summarized as follows. The handover request unit controls the first communication unit so that the first communication unit transmits the handover request to a terminal handover candidate which is a candidate of a new connection destination of the radio terminal.

A fourteenth feature of the present invention relates to the eleventh feature and is summarized as follows. The controller further comprises: a notification request unit (notification request unit 245) configured to control the first communication unit so that the first communication unit transmits a load notification request for requesting a load notification notifying a load of a relay station handover candidate which is a candidate of a new connection destination of the first communication unit; and a connection destination determination unit (handover target determination unit 246) configured to determine a new connection destination of the first communication unit based on the load notification received by the first communication unit, wherein the handover request unit controls the first communication unit so that the first communication unit transmits the handover request to the new connection destination determined by the destination determination unit.

A fifteenth feature of the present invention relates to the fourteenth feature and is summarized as follows. The connection destination determination unit determines, as the new connection destination, a terminal handover candidate having the smallest load or a smaller load than a predetermined amount among the terminal handover candidates based on the load notification.

A sixteenth feature of the present invention relates to the fourteenth feature and is summarized as follows. The first communication unit measures a reception quality of a received radio signal, and the connection destination determination unit determines a new connection destination of the radio terminal based on the load notification and the radio quality.

A seventeenth feature of the present invention relates to the eleventh feature and is summarized as follows. The controller further comprises: a notification request unit (notification request unit 245) configured to control the first communication unit so that the first communication unit transmits a load notification request for requesting a load notification notifying a load of a relay station handover candidate being a candidate of a new connection destination of the first communication unit; and a handover determination unit (handover determination unit 249) configured to determine whether or not to execute the relay station handover based on the load notification received by the first communication unit, wherein when the relay station load exceeds the load allowable amount or when it is predicted that the relay station load exceeds the load allowable amount, and when it is determined that the relay station handover is to be executed, the handover request unit controls the first communication unit so that the first communication unit transmits the handover request.

An eighteenth feature of the present invention relates to the seventeenth feature and is summarized as follows. The handover determination unit calculates a load of the terminal handover candidate that the relay station handover candidate may have if the terminal handover to the terminal handover candidate is executed based on the load notification and the relay station load, and determines whether or not to execute the terminal handover based on the calculated load.

A nineteenth feature of the present invention relates to the eleventh feature and is summarized as follows. The controller further comprises a terminal determination unit (terminal determination unit 248) configured to determine at least one radio terminal to be caused to execute the terminal handover based on the relay station load and a terminal load that a load of each radio terminal so as to keep the relay station load equal to or smaller than the load allowable amount.

A twentieth feature of the present invention relates to the nineteenth feature and is summarized as follows. For each radio terminal, the second communication unit receives a battery notification indicating a remaining battery level of the radio terminal, and the terminal determination unit determines a radio terminal with a higher remaining battery level as a radio terminal to be preferentially caused to execute the terminal handover based on the battery notification received by the second communication unit.

A twenty-first feature of the present invention is summarized as follows. A control method for a radio relay station which comprises a first communication unit configured to communicate with a radio base station or a different radio relay station as a connection destination, a second communication unit configured to communicate with at least one radio terminal, and a relay unit configured to relay data to be exchanged between a connection destination of the first communication unit and the radio terminal, the control method comprises: controlling the first communication unit so that the first communication unit transmits a handover request for executing a terminal handover for switching the connection destination, when a relay station load that is a load of a communication performed by the second communication unit with the radio terminal exceeds a load allowable amount determined according to a load of the connection destination of the first communication unit or when it is predicted that the relay station load exceeds the load allowable amount, and controlling the second communication unit, when the first communication unit received a response message indicating that the terminal handover is allowed or instructed, so that the second communication unit transmits a terminal handover instruction corresponding to the received response message.

The present invention can provide a radio relay station and a control method, which can improve a throughput of a radio terminal by performing proper load balancing.

DESCRIPTION OF THE EMBODIMENTS

Figure 1:
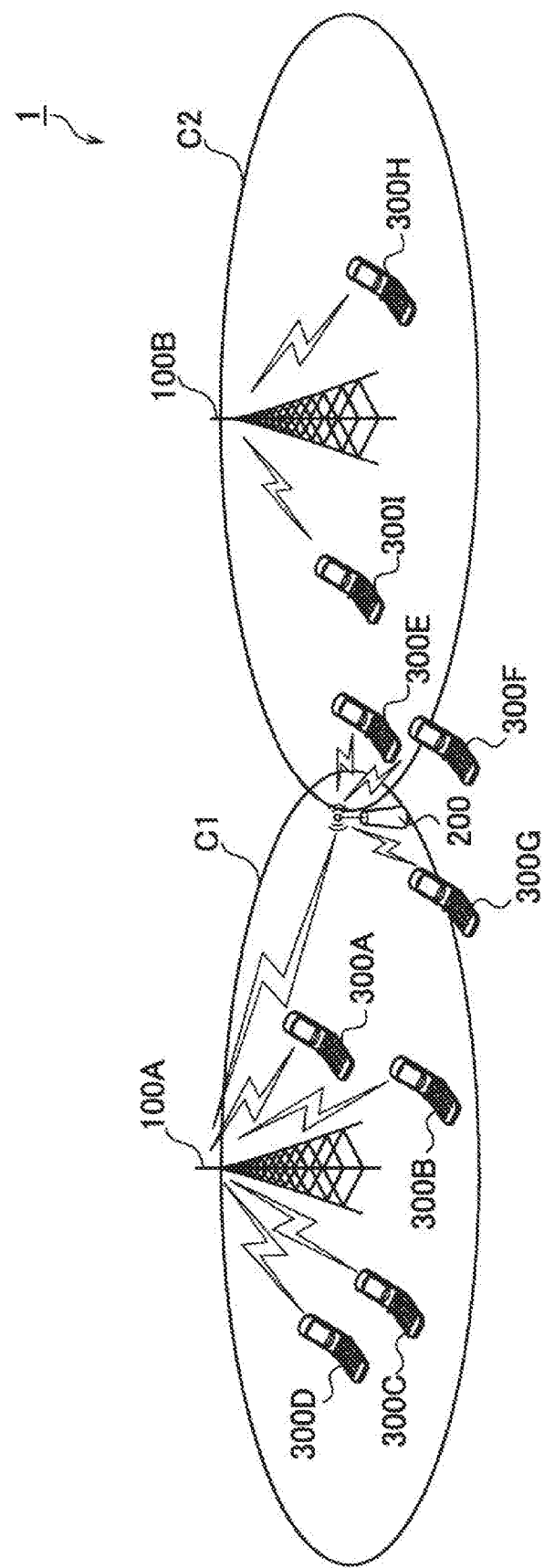
FIG. 1 is a drawing showing a configuration of a radio communication system according to a first embodiment.

Hereinafter, referring to the drawings, description is given to a relay node equivalent to a radio relay station according to the present invention and first to fourth and other embodiments of a radio communication system including the relay node. In the following description of the drawings in the embodiments, same or similar reference numerals are given to denote same or similar portions.

(1) First Embodiment

The first embodiment descries (1.1) Configuration of Radio Communication System, (1.2) Configuration of Relay Node, (1.3) Operation of Radio Communication System, and (1.4) Effects of First Embodiment.

(1.1) Configuration of Radio Communication System

FIG. 1 is a drawing showing a configuration of a radio communication system 1 according to the present embodiment. The radio communication system 1 has a configuration based on, for example, the LTE-Advanced which is regarded as the fourth generation (4G) mobile phone system.

The radio communication system 1 has a radio base station 100A forming a cell C1 and a radio base station 100B forming a cell C2. The cell C1 is a communication area in which connection with the radio base station 100A is possible and the cell C2 is a communication area in which connection with the radio base station 100B is possible. The radio base stations 100A and 100B are macro base stations which respectively form the cell 1 and the cell 2, both having a radius of about a several hundred meters.

The cell C1 and the cell C2 are adjacent to each other with one portion thereof being overlapped with each other, and in the following, the radio base station 100B is referred to as "an adjacent based station of a relay node 200" as need. Note that although two radio base stations are illustrated in FIG. 1, other radio base stations may be further installed adjacent to the two base stations.

The radio base station 100A and the radio base station 100B are connected to each other via a backhaul network (not shown) which is a wired communication network, so that communications can be directly performed between the base stations. In the LTE, such communication interface between the radio base stations is referred to as an X2 interface.

The radio base station 100A is connected to radio terminals 300A to 300D and the relay node 200 via a radio link. The radio terminals 300A to 300D directly communicate with the radio base station 100A. The radio terminals in the present embodiment are configured to be movable. The relay node 200 is installed in an end portion of the cell C1 and in a vicinity of the cell C2.

The relay node 200 is connected to radio terminals 300E to 300G via the radio link. The relay node 200 is a radio relay station to relay communications between the radio terminals 300E to 300G and the radio base station 100A. It is assumed in the present embodiment that the relay node 200 is a fixed type of relay node.

The radio terminals 300E to 300G indirectly communicate with the radio base station 100A via the relay node 200. With such relay transmission, the radio terminals 300E to 300G can communicate with the radio base station 100A even in the outside of the cell C1. In the following description, the radio terminals 300E to 300G which are connected to the relay node 200 are referred to as "radio terminals under the relay node 200" as needed.

The radio base station 100B is connected to radio terminals 300H and 300I via a radio link. The radio terminals 300H and 300I directly communicate with the radio base station 100B. In the following description, when the radio base stations 100A and 100B are not distinguished from each other, they are simply referred to as a "radio base station 100", and when the radio terminals 300A to 300I are not distinguished from one another, they are simply referred to as "a radio terminal 300".

In the example of FIG. 1, there are 7 radio terminals which directly or indirectly communicate with the radio base station 100A, and there are 2 radio terminals which communicate with the radio base station 100B. For this reason, the radio base station 100A is in a situation in which a load is higher than that of the radio base station 100B.

When the load of the radio base station 100A is high (for example, when an amount of traffic handled by the radio base station 100A is large), few radio resources are allocated to the relay node 200. Accordingly, a communication capacity between the radio base station 100A and the relay node 200 becomes smaller, and a communication capacity between the relay node 200 and the radio terminals 300E to 300G also becomes smaller. Thus, a throughput of the radio terminals 300E to 300G becomes lower.

Figure 2:
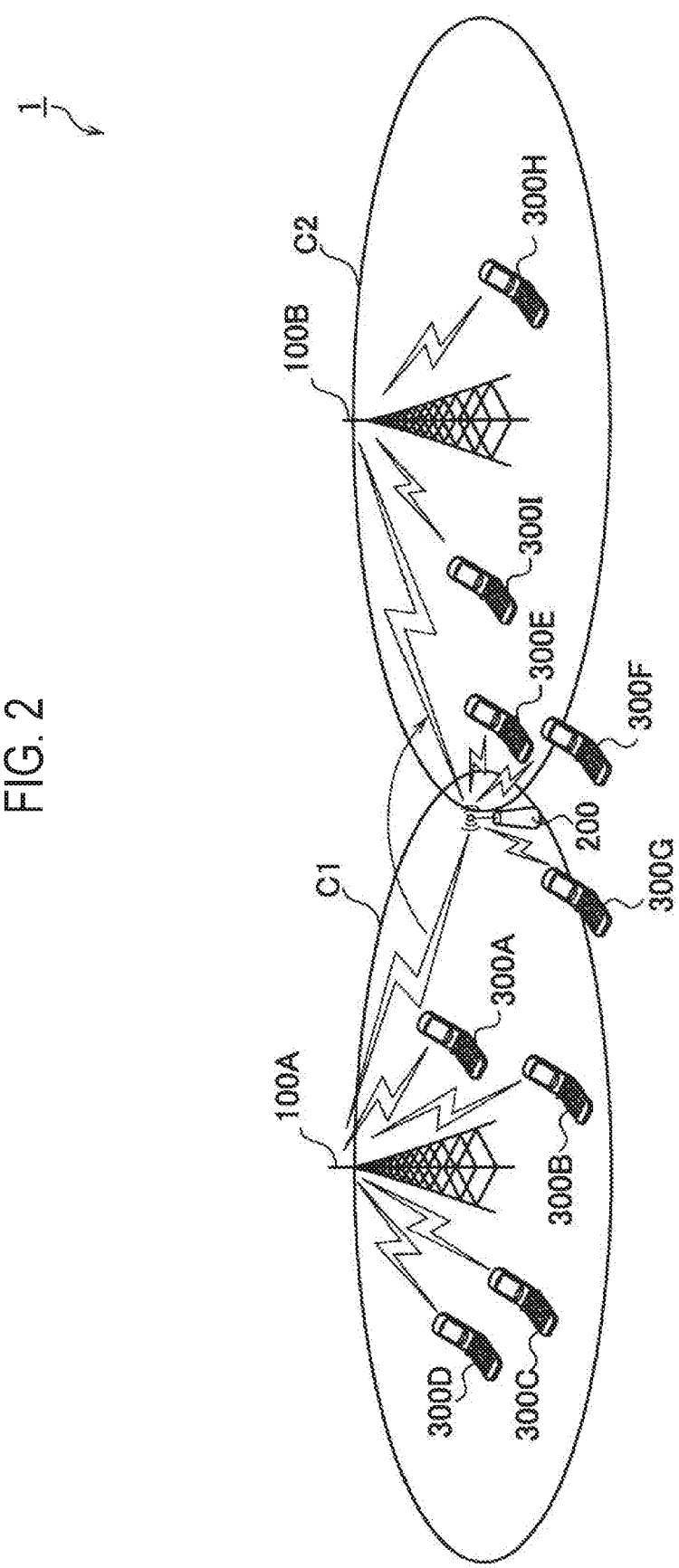
FIG. 2 is a drawing for illustrating a relay handover.

In the first embodiment, when the load of the radio base station 100A is high, as shown in FIG. 2, in order to prevent the throughput of the radio terminals 300E to 300G from being lowered, a handover (hereinafter, a relay handover) in which the relay node 200 switches a connection destination from the radio base station 100A to an adjacent base station (the radio base station 100B) is executed.

(1.2) Configuration of Relay Node

Figure 3:
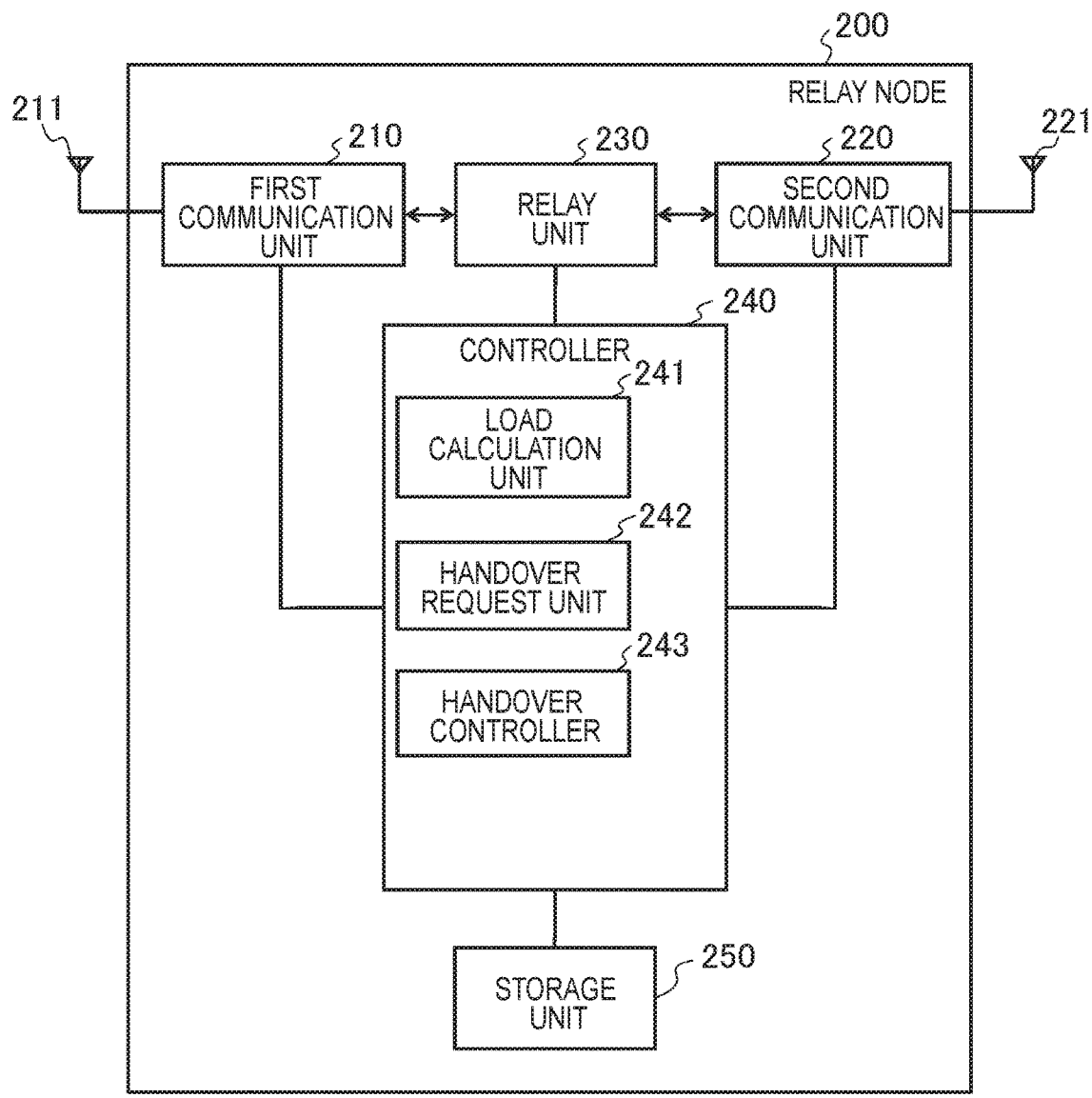
FIG. 3 is a block diagram showing a configuration of a relay node according to the first embodiment.

Next, the description is given to a configuration of the relay node 200 according to the first embodiment. FIG. 3 is a block diagram showing the configuration of the relay node 200 according to the first embodiment.

As shown in FIG. 3, the relay node 200 has a first communication unit 210, a second communication unit 220, a relay unit 230, a controller 240, and a storage unit 250.

The first communication unit 210 is configured using, for example, a RF circuit or a BB circuit, and performs transmission/reception with the radio base station 100. The first communication unit 210 performs coding and modulation to convert transmission data to a transmission signal, and performs amplification and up-convert to convert the transmission signal to a radio signal to be transmitted from an antenna 211. The first communication unit 210 performs amplification and down-convert to convert the radio signal received by the antenna 211 to a receiving signal, and performs demodulation and decoding to convert the receiving signal to receiving data.

Also, the first communication unit 210 measures a radio quality of the radio signal which is received by the first communication unit 210. The radio quality means a received signal strength indication (RSSI) of a reference signal which is periodically transmitted from the radio base station 100 or a carrier to interference plus noise ratio (CINR) of the reference signal.

The second communication unit 220 is configured using a RF circuit or a BB circuit, and transmits/receives the radio signal to/from the radio terminal 300. The second communication unit 220 performs coding and modulation to convert transmission data to a transmission signal, and performs amplification and up-convert to convert the transmission signal to a radio signal to be transmitted from an antenna 221. The second communication unit 220 performs amplification and down-convert to convert the radio signal received by the antenna 221 to a receiving signal, and performs demodulation and decoding to convert the receiving signal to receiving data.

The relay unit 230 relays data between the first communication unit 210 and the second communication unit 220. Specifically, the relay unit 230 relays the receiving data from the first communication unit 210 to the second communication unit 220 as transmission data and relays the receiving data from the second communication unit 220 to the first communication unit 210 as transmission data.

The controller 240 is configured using, for example, a CPU, and controls various kinds of functions which are included in the relay node 200. The storage unit 250 is configured using, for example, a memory and stores various pieces of information to be used for controlling the relay node 200.

The controller 240 controls each of the first communication unit 210, the second communication unit 220, and the relay unit 230. The controller 240 has a load calculation unit 241, a handover request unit 242, and a handover controller 243.

The load calculation unit 241 regularly calculates a relay node load being a load of communications which are performed between the second communication unit 220 and the radio terminal 300 under the relay node 200. The relay node load means herein a requisite amount of a radio resource (a resource block) in the second communication unit 220 or an amount of data (a traffic amount) to be transmitted/received by the second communication unit 220. The relay node load is an overall load of the radio terminals under the relay node 200 and may be an uplink load or a down-link load.

Also, the load calculation unit 241 regularly calculates a base station load being a load of communications which are performed between the first communication unit 210 and the radio base station 100A. The base station load means, for example, an available amount of radio resource (resource block) in the first communication unit 210 or an amount of data (a traffic amount) transmittable/receivable by the first communication unit 210. The base station load depends on a state of the load of the radio base station 100A and may be an uplink load or a down-link load.

When the relay node load is relatively higher than the base station load, a throughput of the radio terminal 300 under the relay node 200 becomes peaked. For this reason, in the present embodiment, when the relay node load is higher than a load allowable amount which is determined according to the base station load, the handover request unit 242 controls the first communication unit 210 so that the first communication unit 210 can transmit a relay handover request for executing a relay handover. The load allowable amount may be a value per se of the base station load or may be a value slightly smaller than the value of the base station load.

In addition, the handover request unit 242 controls the first communication unit 210 so that the first communication unit 210 can transmit a relay handover request in which the relay node load information indicating the relay node load is contained. With this, a transmission destination of the relay handover request can understand a required load based on the received relay handover request.

Note that, there are two methods of designating a transmission destination of the relay handover request.

In a first transmission destination designation method, the handover request unit 242 controls the first communication unit 210 so that the first communication unit 210 can transmit a relay handover request toward a relay handover candidate which is a handover candidate of the first communication unit 210. The relay handover candidate may be a predetermined radio base station or may be a radio base station whose radio quality measured by the first communication unit 210 is satisfactory (but excluding the radio base station 100A). In the case of the first transmission destination designation method, the handover request unit 242 contains identification information (DeNB PCID) identifying the relay handover candidate in the relay handover request. When receiving the relay handover request, the radio base station 100A transfers the relay handover request to the radio base station which is identified by the identification information contained in the relay handover request.

In a second transmission destination designation method, a particular radio base station is not designated but any adjacent base station of the radio base station 100A is designated. In this case, the radio base station 100A which receives the relay handover request determines a transfer destination of the relay handover request. In the case of the second transmission destination designation method, the handover request unit 242 contains information on the radio quality measured by the first communication unit 210 in the relay handover request. When receiving the relay handover request, the radio base station 100A identifies the radio base station whose radio quality is satisfactory for the relay node 200 based on the information on the radio quality which is contained in the relay handover request and transfers the relay handover request to the identified radio base station.

When the first communication unit 210 received a handover instruction to instruct the relay handover from the radio base station 100A, the handover controller 243 controls the first communication unit 210 so that the first communication unit 210 can execute the relay handover. For example, the handover instruction contains information to be used for communications with a new connection destination (hereinafter, a handover target).

By the control of the handover controller 243, the first communication unit 210 terminates the communications with the radio base station 100A and starts communications with the handover target. When the first communication unit 210 communicates with the handover target, the relay unit 230 relays data to be exchanged between the handover target and the radio terminal 300 under the relay node 200.

(1.3) Operation of Radio Communication System

Figure 4:
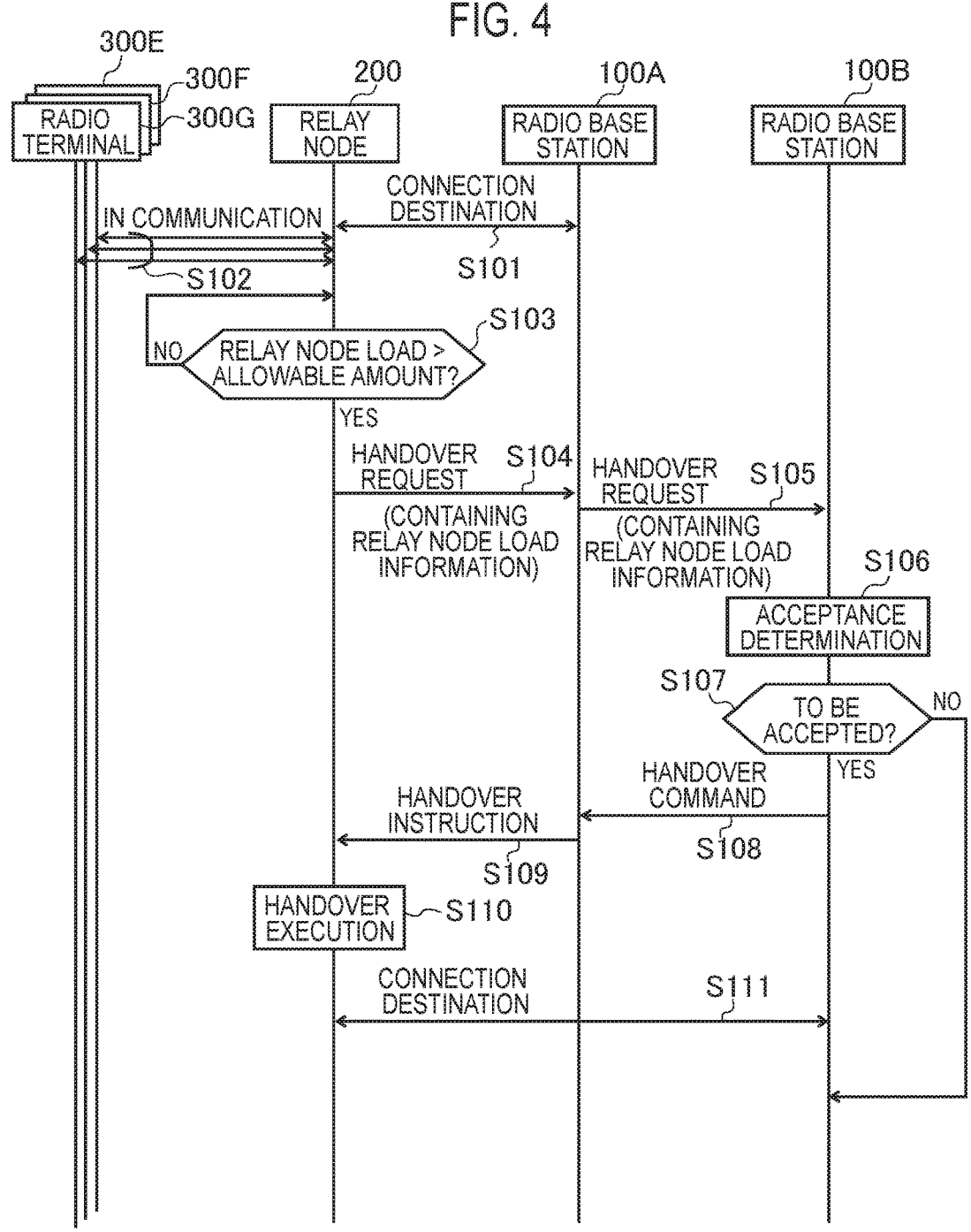
FIG. 4 is a sequence diagram showing an operation of the radio communication system according to the first embodiment.

Next, an operation of the radio communication system 1 according to the first embodiment is described. FIG. 4 is a sequence diagram showing an operation of the radio communication system 1 according to the first embodiment. Here, the description is given to an example in which the relay node 200 performs a relay handover from the radio base station 100A to the radio base station 100B.

At step S201, the first communication unit 210 of the relay node 200 regards the radio base station 100A as a connection destination and performs communications with the radio base station 100A.

At step S202, the second communication unit 220 of the relay node 200 communicates with the radio terminal 300 which is a connection destination of the radio terminal 300 under the relay node 200 and is the radio terminal 300 under the relay node 200.

At step S203, the handover request unit 242 of the relay node 200 compares the relay node load with the load allowable amount. When the relay node load exceeds the load allowable amount, at step S204, the handover request unit 242 of the relay node 200 controls the first communication unit 210 so that the first communication unit 210 can transmit a relay handover request to the radio base station 100A. The relay handover request transmitted from the first communication unit 210 is received by the radio base station 100A via the radio link.

At step S205, the radio base station 100A transmits the relay handover request to the radio base station 100B according to the first transmission destination determination method or the second transmission destination determination method. The radio base station 100B receives the relay handover request via the X2 interface.

At step S206, based on the received relay handover request, the radio base station 100B determines whether or not to accept the relay node 200. For example, when a result obtained by adding the relay node load acquired from the relay handover request to the load of the radio base station 100B is equal to or smaller than a predetermined threshold, the radio base station 100B determines that the relay node 200 is to be accepted.

When it is determined that the relay node 200 is to be accepted (Step S207; YES), at step S208, the radio base station 100B transmits a handover command to instruct the relay handover to the radio base station 100A. The radio base station 100A receives the handover command via the X2 interface.

At step S209, the radio base station 100A transmits the handover instruction to instruct the relay handover to the relay node 200. The first communication unit 210 of the relay node 200 receives the handover instruction via the radio link.

At step S210, the handover controller 243 of the relay node 200 controls the first communication unit 210 so that the first communication unit 210 can execute the relay handover to the radio base station 100B.

At step S211, the first communication unit 210 of the relay node 200 communicates with the radio base station 100B regarding the radio base station 100B as a new connection destination.

(1.4) Effects of First Embodiment

As described above, according to the first embodiment, a relay handover request to execute a relay handover is transmitted to the radio base station 100A when the relay node load exceeds the load allowable amount.

When the relay handover is accepted by the radio base station 100B, the relay node 200 executes the relay handover to the radio base station 100B according to the handover instruction. Then, the relay node 200 relays data to be exchanged between the radio base station 100B in the handover target and the radio terminal 300 under the relay node 200.

Accordingly, the relay node 200 can perform the handover to the radio base station 100B whose load is smaller than that of the radio base station 100A. Thus, the communication capacity of the radio terminal 300 under the relay node 200 can be increased after the handover, and thus the throughput of the radio terminal 300 under the relay node 200 can be improved.

Also, since the load of the radio terminal 300 under the relay node 200 is reduced, the radio base station 100A also improves the throughput of the radio terminals 300A to 300D which directly communicate with the radio base station 100A.

In the present embodiment, the relay node 200 transmits the relay handover request toward the relay handover candidate. For this reason, the relay handover request can be transmitted to the relay handover candidate, and whether the relay handover is accepted or not can be asked of the relay handover candidate.

In the present embodiment, the relay node 200 transmits the relay handover request in which the relay node load information indicating the relay node load is contained. Accordingly, the relay handover candidate can determine the acceptance in consideration of the relay node load. Thus, the load in the handover target after the relay handover can be prevented from becoming excessively high.

Note that since a plurality of the radio terminals 300 can be connected to the relay node 200, the effect of reducing the load of the radio base station 100A by the relay handover is large. Also, it is assumed that the relay node 200 is installed in the cell edge or the overage hole, and the relay node 200 has an advanced radio communication function. Thus, it is likely that the relay node 200 can achieve a preferable communication even after the handover.

(2) Second Embodiment

Hereinafter, the second embodiment is described in the order of (2.1) Configuration of Relay node, (2.2) Operation of Radio Communication System, and (2.3) Effects of Second Embodiment. However, the description is given to portions different from those of the first embodiment, and the duplicated description is omitted.

Figure 5:
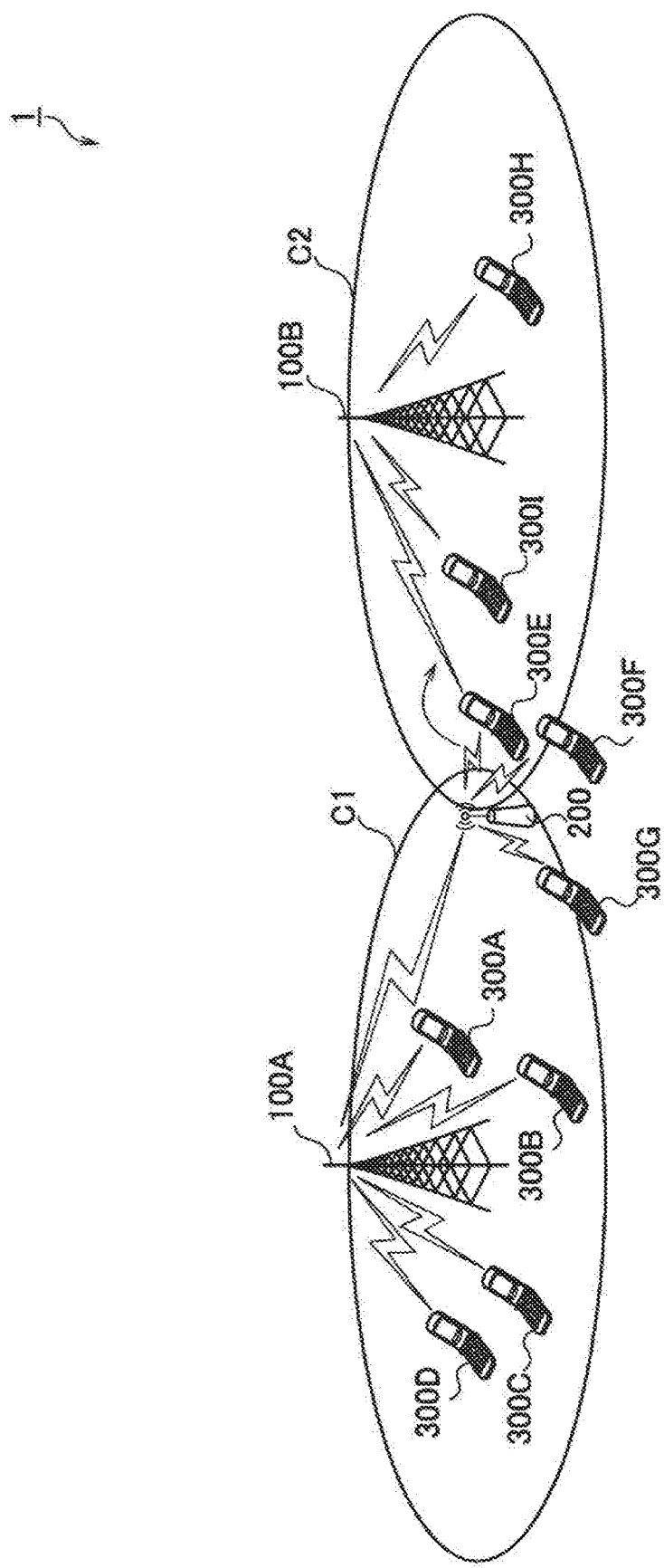
FIG. 5 is a drawing for illustrating a terminal handover.

In the second embodiment, as shown in FIG. 5, the description is mainly given to a terminal handover in which a radio terminal 300 under a relay node 200 switches a connection destination from a radio base station 100A to an adjacent base station (such as a radio base station 100B) of the radio base station 100A.

(2.1) Configuration of Relay Node

Figure 6:
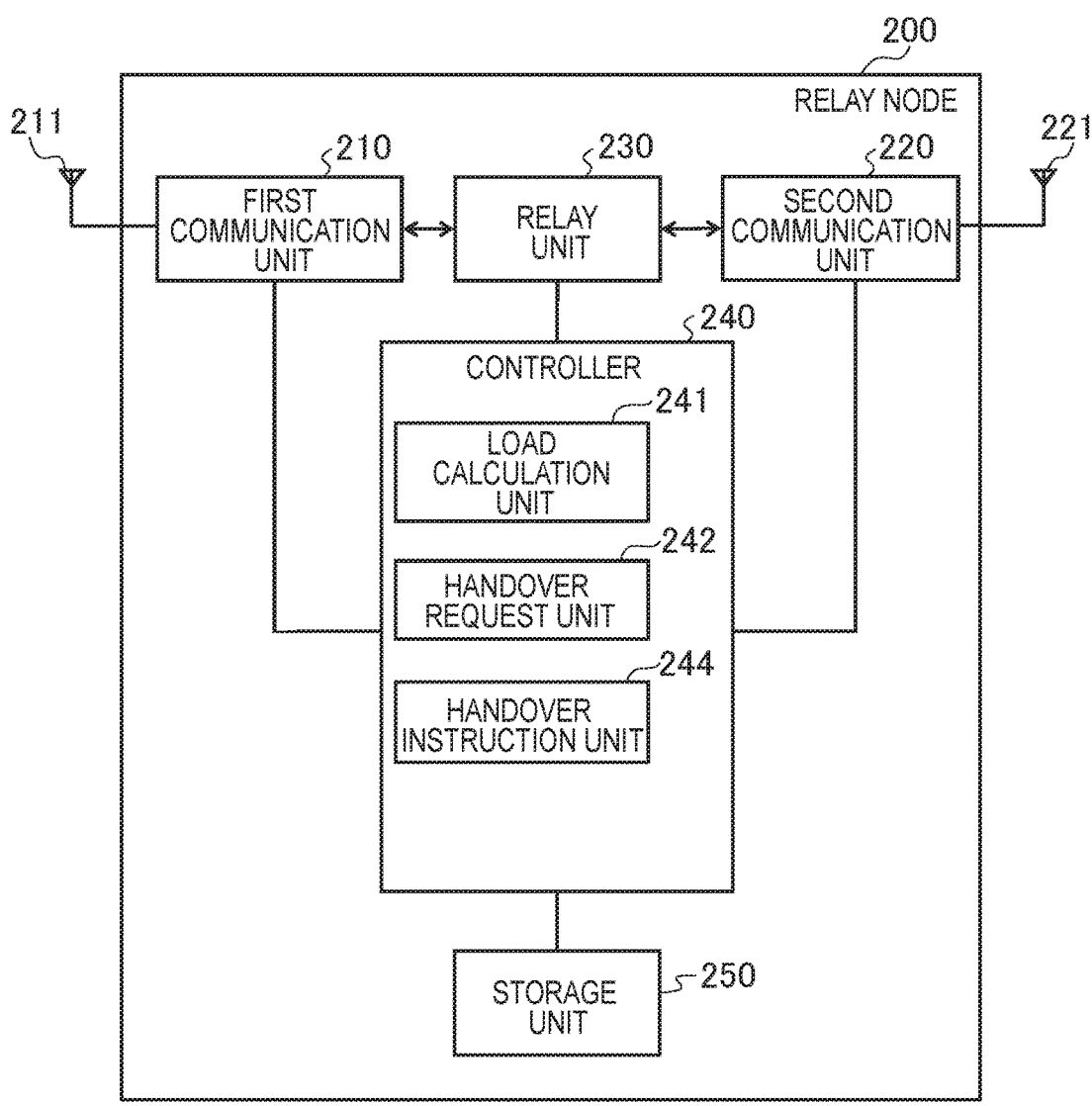
FIG. 6 is a block diagram showing a configuration of a relay node according to a second embodiment.

FIG. 6 is a block diagram showing a configuration of the relay node 200 according to the second embodiment.

As shown in FIG. 6, the relay node 200 according to the second embodiment has a controller 240 with a configuration different from that of the controller 240 of the first embodiment. Also, a second communication unit 220 receives a measurement result notification indicating a measurement result of a radio quality which is measured by each radio terminal 300 under the relay node 200.

The controller 240 has a load calculation unit 241, a handover request unit 242, and a handover instruction unit 244.

The load calculation unit 241 has a function to calculate a terminal load being a load per radio terminal 300 under the relay node 200 in addition to the functions described in the first embodiment. The terminal load means an individual load of communications between each radio terminal 300 under the relay node 200 and the second communication unit 220.

In the present embodiment, when a relay node load is higher than a load allowable amount, the handover request unit 242 controls the first communication unit 210 so that at least one radio terminal 300 under the relay node 200 transmits a terminal handover request for executing a terminal handover to the radio base station 100A.

The number of radio terminals to execute the terminal handover may be determined according to the relay node load. For example, the minimum number of radio terminals making the relay node load smaller than the load allowable amount may be caused to execute the terminal handover. Such a method is described in a fourth embodiment.

Also, the handover request unit 242 controls the first communication unit 210 so that the first communication unit 210 can transmit a terminal handover request in which the terminal load information indicating a terminal load corresponding to the radio terminal to be caused to execute the terminal handover is contained.

Note that similar to the first embodiment, there are two methods of designating a transmission destination of the terminal handover request.

In a first transmission destination designation method, the handover request unit 242 controls the first communication unit 210 so that the first communication unit 210 can transmit a terminal handover request toward a terminal handover candidate being a handover candidate of the radio terminal 300 under the relay node 200. The terminal handover candidate may be a predetermined radio base station or may be a radio base station whose radio quality which is shown by the measurement result notification received by the second communication unit 220 is satisfactory (but excluding the radio base station 100A). In the case of the first transmission destination designation method, the handover request unit 242 contains identification information (DeNB PCID) identifying the terminal handover candidate in the terminal handover request. When receiving the terminal handover request, the radio base station 100A transfers the terminal handover request to the radio base station which is identified by the identification information contained in the terminal handover request.

In a second transmission destination designation method, a particular radio base station is not designated but any adjacent base station of the radio base station 100A is designated. In this case, the radio base station 100A which receives the terminal handover request determines a transfer destination of the terminal handover request. In the case of the second transmission destination designation method, the handover request unit 242 contains the radio quality information which is indicated by the measurement result notification received by the second communication unit 220 in the terminal handover request. When receiving the terminal handover request, the radio base station 100A identifies the radio base station whose radio quality is satisfactory for the radio terminal 300 under the relay node 200 based on the radio quality information which is contained in the terminal handover request and transfers the terminal handover request to the identified radio base station.

When the first communication unit 210 received a handover instruction to instruct the terminal handover from the radio base station 100A, the handover instruction unit 244 controls the second communication unit 220 so that the second communication unit 220 can transmit a terminal handover instruction corresponding to the received handover instruction to the radio terminal 300 under the relay node 200. For example, the handover instruction contains information (such as identification information of the handover target or channel information) to be used for communications with the handover target.

The radio terminal 300 which received the terminal handover instruction terminates the communication with the relay node 200 and starts the communication with the handover target.

(2.2) Operation of Radio Communication System

Figure 7:
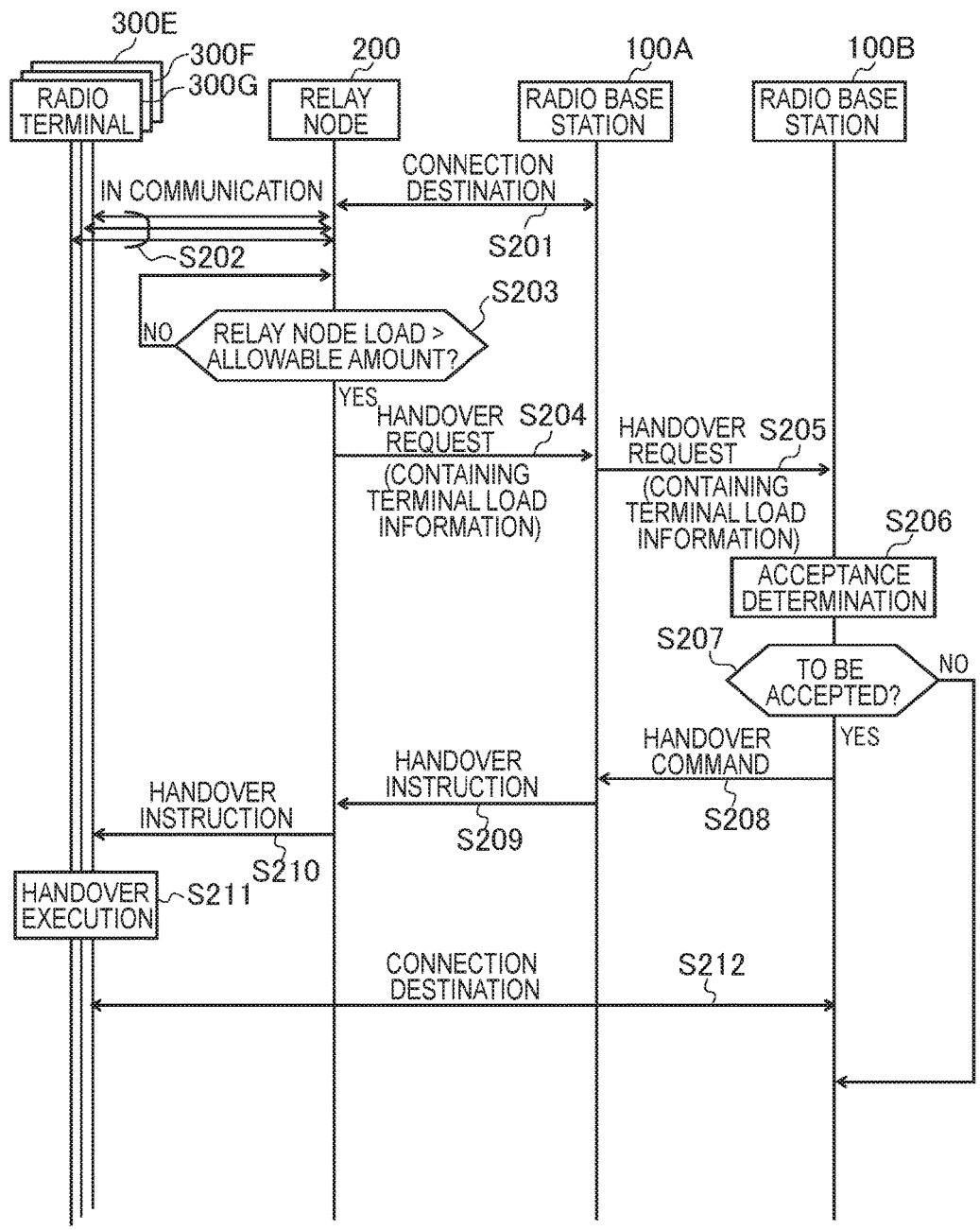
FIG. 7 is a sequence diagram showing an operation of a radio communication system according to the second embodiment.

Next, an operation of the radio communication system 1 according to the second embodiment is described. FIG. 7 is a sequence diagram showing an operation of the radio communication system 1 according to the second embodiment. Here, the description is given to an example in which a radio terminal 300E under the relay node 200 performs a relay handover from the relay node 200 to the radio base station 100B (see, FIG. 5).

Step S201 and step S202 are similar to those of the first embodiment.

At step S203, the handover request unit 242 of the relay node 200 compares a relay node load with a load allowable amount. When the relay node load exceeds the load allowable amount, at step S204, the handover request unit 242 of the relay node 200 controls the first communication unit 210 so that the first communication unit 210 can transmit the terminal handover request containing the load information of the radio terminal 300E to the radio base station 100A. The terminal handover request transmitted from the first communication unit 210 is received by the radio base station 100A via the radio link.

At step S205, the radio base station 100A transmits the terminal handover request to the radio base station 100B according to the first transmission destination designation method or the second transmission destination designation method. The radio base station 100B receives the terminal handover request via the X2 interface.

At step S206, the radio base station 100B determines whether or not to accept the radio terminal 300E based on the received terminal handover request. For example, when the result obtained by adding the load of the radio terminal 300E acquired from the terminal handover request to the load of the radio base station 100B is equal to or smaller than a predetermined threshold, the radio base station 100B determines that the relay node 200 is to be accepted.

When it is determined that the radio terminal 300E is accepted (Step S207; YES), at step S208, the radio base station 100B transmits a handover command to instruct the terminal handover to the radio base station 100A. The radio base station 100A receives the handover command via the X2 interface.

At step S209, the radio base station 100A transmits the handover instruction to instruct the terminal handover to the relay node 200. The first communication unit 210 of the relay node 200 receives the handover instruction via the radio link.

At step S210, the handover controller 243 of the relay node 200 controls the second communication unit 220 so that the second communication unit 220 can transmit the terminal handover instruction corresponding to the received handover instruction to the radio terminal 300E. The radio terminal 300E receives the handover instruction via the radio link and performs the terminal handover according to the handover instruction (Step S211).

At step S212, the radio terminal 300E communicates with the radio base station 100B regarding the radio base station 100B as a new connection destination (a handover target).

(2.3) Effects of Second Embodiment

As described above, according to the second embodiment, when the relay node load exceeds the load allowable amount, the relay node 200 transmits the terminal handover request for executing the terminal handover to the radio base station 100A. The radio base station 100A receives the terminal handover and transmits it to the radio base station 100B.

When the radio base station 100B accepts the terminal handover, the relay node 200 receives the handover instruction to instruct the terminal handover, and transmits the handover instruction to the radio terminal 300 under the relay node 200. The radio terminal 300 which received the handover instruction executes the terminal handover.

Accordingly, the radio terminal 300 under the relay node 200 can perform the handover to the radio base station 100B whose load is small, so that a communication capacity of the radio terminal 300 can be increased after the handover, and thus a throughput can be improved.

In the present embodiment, the relay node 200 transmits the terminal handover request toward the terminal handover candidate. For this reason, the terminal handover request can be transmitted to the terminal handover candidate, and whether the terminal handover is accepted or not can be asked of the terminal handover candidate.

In the present embodiment, the relay node 200 transmits the terminal handover request in which the terminal load information indicating a load for each radio terminal 300 is contained. Accordingly, the terminal handover candidate can determine the acceptance in consideration of the terminal load. Thus, the load in the handover target after the terminal handover can be prevented from becoming excessively high.

(3) Third Embodiment

Hereinafter, a third embodiment is described in the order of (3.1) Configuration of Relay Node, (3.2) Operation of Radio Communication System, and (3.3) Effects of Third Embodiment. However, the description is given to portions different from those of the first embodiment and the second embodiment, and the duplicated description is omitted.

(3.1) Configuration of Relay Node

Figure 8:
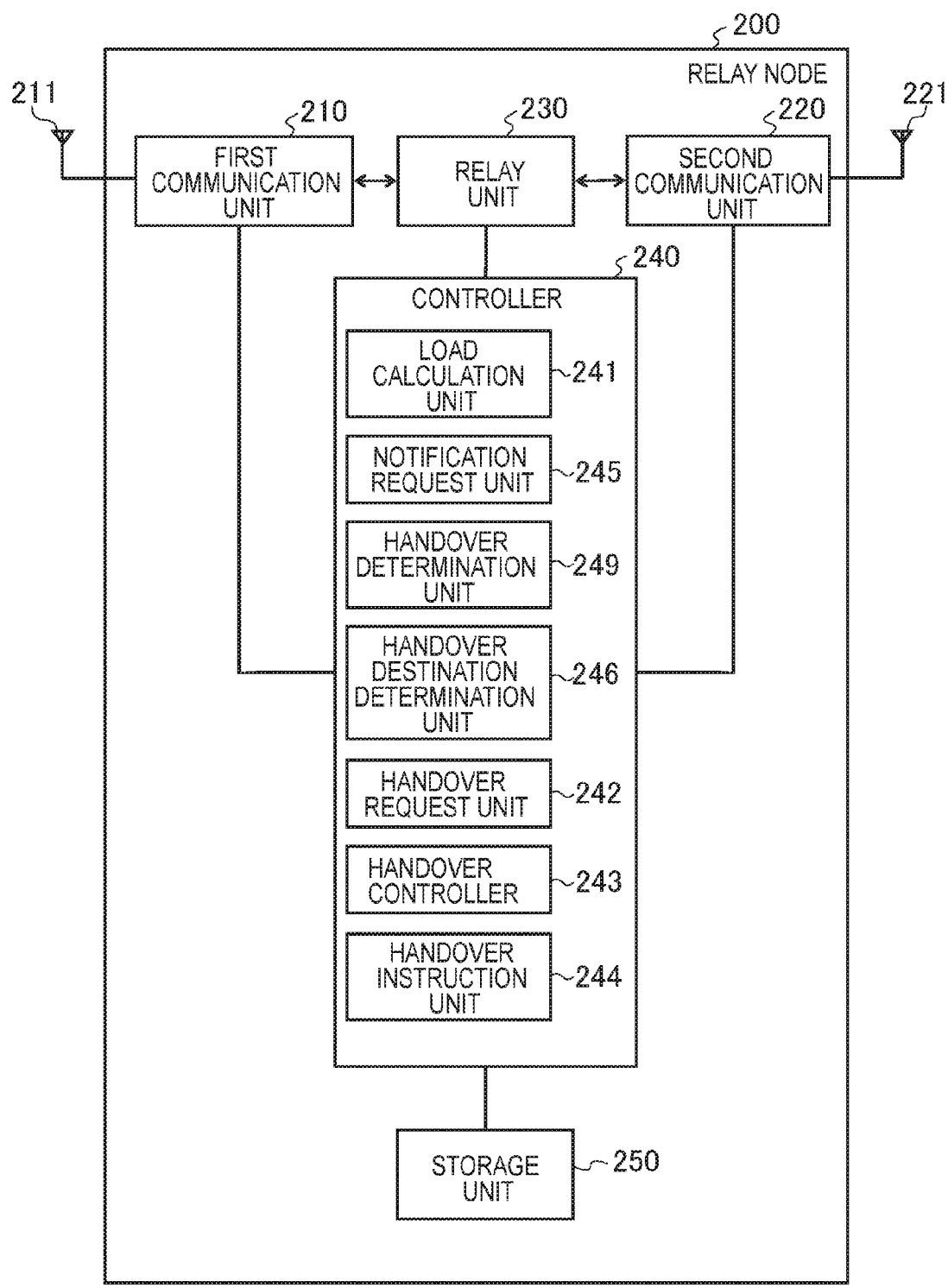
FIG. 8 is a block diagram showing a configuration of a relay node according to a third embodiment.

FIG. 8 is a block diagram showing a configuration of a relay node 200 according to a third embodiment.

As shown in FIG. 8, the relay node 200 according to the third embodiment has a controller 240 whose configuration is different from that of the controller 240 in the first embodiment and the second embodiment.

The controller 240 has a load calculation unit 241, a notification request unit 245, a handover determination unit 249, a handover target determination unit 246, a handover request unit 242, a handover controller 243, and a handover instruction unit 244.

The load calculation unit 241 has functions similar to those of the first embodiment and the second embodiment.

The notification request unit 245 controls the first communication unit 210 so that the first communication unit 210 can transmit a load notification request for requesting a load notification of each of a terminal handover candidate and a relay handover candidate. It is assumed that the above-described first transmission designation method is applied to the load notification request.

The handover determination unit 249 determines whether or not to execute a terminal handover or a relay handover based on the load notification which is received by the first communication unit 210. For example, when a load of each of the terminal handover candidate and the relay handover candidate is higher than a predetermined amount, the handover target determination unit 246 determines that neither the terminal handover nor the relay handover is to be executed.

The handover target determination unit 246 determines a handover target based on the load notification which is received by the first communication unit 210. For example, as a handover target, the handover target determination unit 246 determines one having the smallest load or a smaller load than a predetermined amount from the terminal handover candidate and the relay handover candidate.

When the relay node load exceeds a load allowable amount and it is determined that the terminal handover or the relay handover is executed, the handover request unit 242 transmits a handover request. The handover request 242 controls the first communication unit 210 so that the first communication unit 210 can transmit the handover request toward the handover target determined by the handover target determination unit 246. Specifically, the handover request unit 242 contains identification information identifying the determined handover target in the handover request.

When the first communication unit 210 received the handover instruction to instruct the relay handover, the handover controller 243 controls the first communication unit 210 so that the first communication unit 210 can execute the relay handover.

When the first communication unit 210 received the handover instruction to instruct the terminal handover, the handover instruction unit 244 controls the second communication unit 220 so that the second communication unit 220 can transmit a terminal handover instruction to the radio terminal 300 under the relay node 200.

Other configurations are same as those of the first embodiment and the second embodiment.

(3.2) Operation of Radio Communication System

Figure 9:
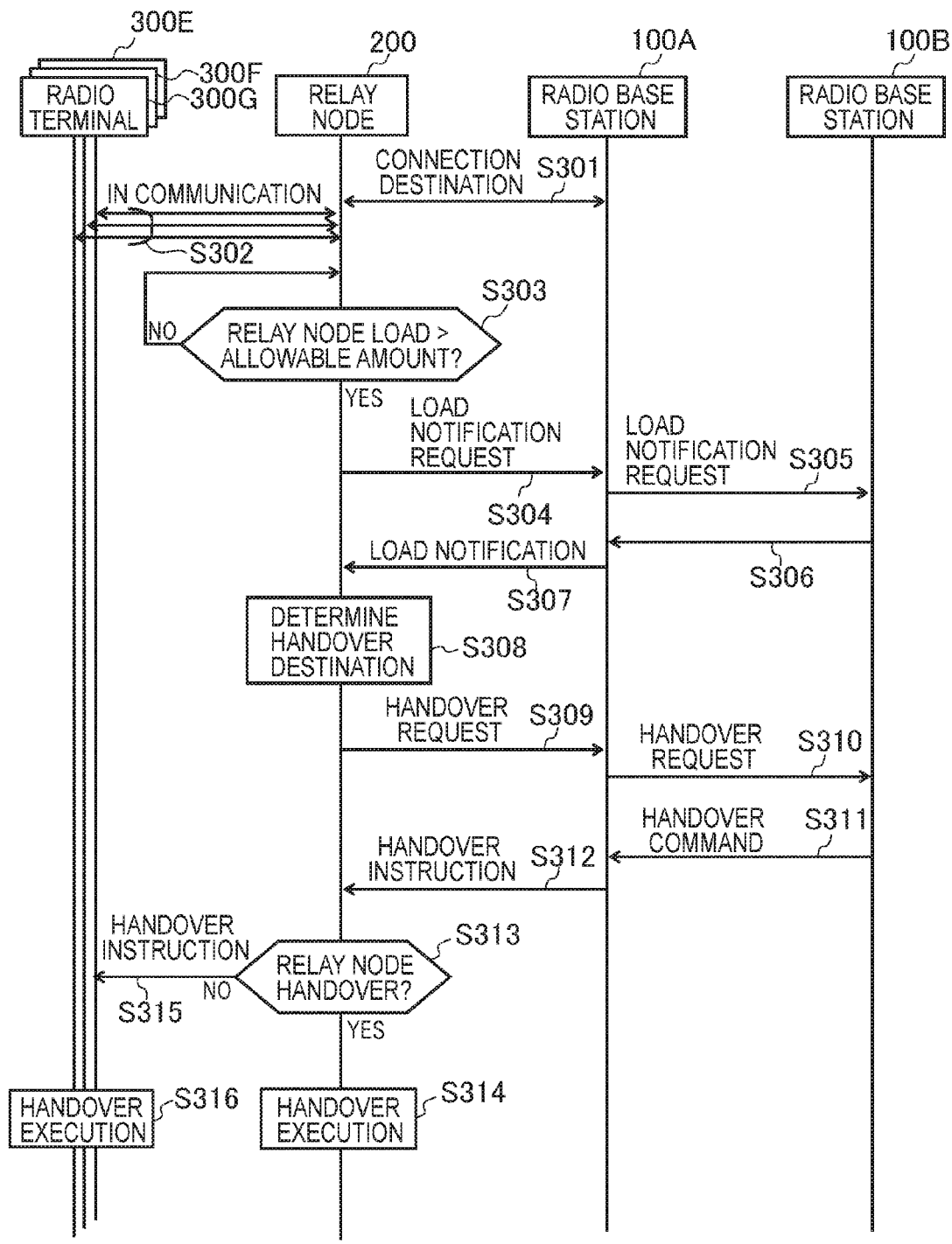
FIG. 9 is a sequence diagram showing an entire operation of a radio communication system according to the third embodiment.

FIG. 9 is a sequence diagram showing an entire operation of the radio communication system 1 according to the third embodiment.

Steps S301 and S302 are similar to those of the above-described embodiments.

When the relay node load exceeds the load allowable amount (Step S303; YES), at step S304, the notification request unit 245 of the relay node 200 controls the first communication unit 210 so that the first communication unit 210 can transmit a load notification request for requesting a load notification of each of the terminal handover candidate and the relay handover candidate. The first communication unit 210 transmits the load notification request to the radio base station 100A. The radio base station 100A receives the load notification request via the radio link.

At step S305, the radio base station 100A transmits the load notification request to the radio base station 100B based on the identification information contained in the received load notification request. The radio base station 100B receives the load notification request via the X2 interface.

At step S306, the radio base station 100B transmits the load notification notifying the load of the radio base station 100B to the radio base station 100A. The radio base station 100A receives the load notification via the X2 interface.

At step S307, the radio base station 100A transmits the load notification to the relay node 200. The first communication unit 210 of the relay node 200 receives the load notification via the radio link.

At step S308, the handover determination unit 249 and handover target determination unit 246 of the relay node 200 determine a handover target from each of the terminal handover candidate and the relay handover candidate. Here, it is assumed that the radio base station 100B is determined as a handover target.

At step S309, the handover request unit 242 of the relay node 200 controls the first communication unit 210 so that the first communication unit 210 can transmit a handover request toward the determined handover target. The first communication unit 210 transmits the handover request to the radio base station 100A. The radio base station 100A receives a handover request via the radio link.

At step S310, the radio base station 100A transmits the handover request to the radio base station 100B based on the identification information of the handover target which is contained in the received handover request. The radio base station 100B receives the handover request via the X2 interface.

At step S311, the radio base station 100B transmits a handover command to accept the handover to the radio base station 100A. The radio base station 100A receives the handover command via the X2 interface.

At step S312, the radio base station 100A transmits the handover instruction to the relay node 200. The first communication unit 210 of the relay node 200 receives the handover instruction via the radio link.

When the handover instruction received by the first communication unit 210 of the relay node 200 is a handover instruction to the relay node 200 (S313; YES), at step S314, the handover controller 243 of the relay node 200 controls the first communication unit 210 so that the first communication unit 210 can perform the relay handover from the radio base station 100A to the radio base station 100B according to the handover instruction.

When the handover instruction received by the first communication unit 210 is a handover instruction to the radio terminal 300 under the relay node 200 (step S313; NO), at step S315, the handover instruction unit 244 of the relay node 200 controls the second communication unit 220 so that the second communication unit 220 can transmit a handover instruction to the appropriate radio terminal. The second communication unit 220 transmits the handover instruction. The radio terminal 300 under the relay node 200, which received the handover instruction, executes the terminal handover from the radio base station 100A to the radio base station 100B.

Note that in the present operational sequence, the relay node 200 transmits the load notification request at YES of step S303, but the load notification request may be regularly transmitted. In this case, a load state of the handover candidate can be known in advance and processing relating to the handover can be completed earlier.

(3.3) Effects of Third Embodiment

As described above, the relay node 200 determines the handover target based on the load notification which is received by the first communication unit 210, and transmits a handover request to the determined handover target. Accordingly, the handover target is determined in consideration of the load of the handover candidate, so that a proper handover target can be determined.

In the present embodiment, as the handover target, the relay node 200 determines the handover candidate having the smallest load or a smaller load than a predetermined amount among the handover candidates. This can prevent the load of the handover target after the handover from being excessively high.

In the present embodiment, the relay node 200 determines whether or not to execute the handover based on the load notification received by the first communication unit 210. This can stop the handover to any of the handover candidates in a state where the loads of all the handover candidates are high.

(4) Fourth Embodiment

Hereinafter, a fourth embodiment is described in the order of (4.1) Configuration of Relay Node, (4.2) Operation of Radio Communication System, and (4.3) Effects of Fourth Embodiment. However, portions different from those of the first embodiment to the third embodiments are described, and the duplicated description is omitted.

(4.1) Configuration of Relay Node

Figure 10:
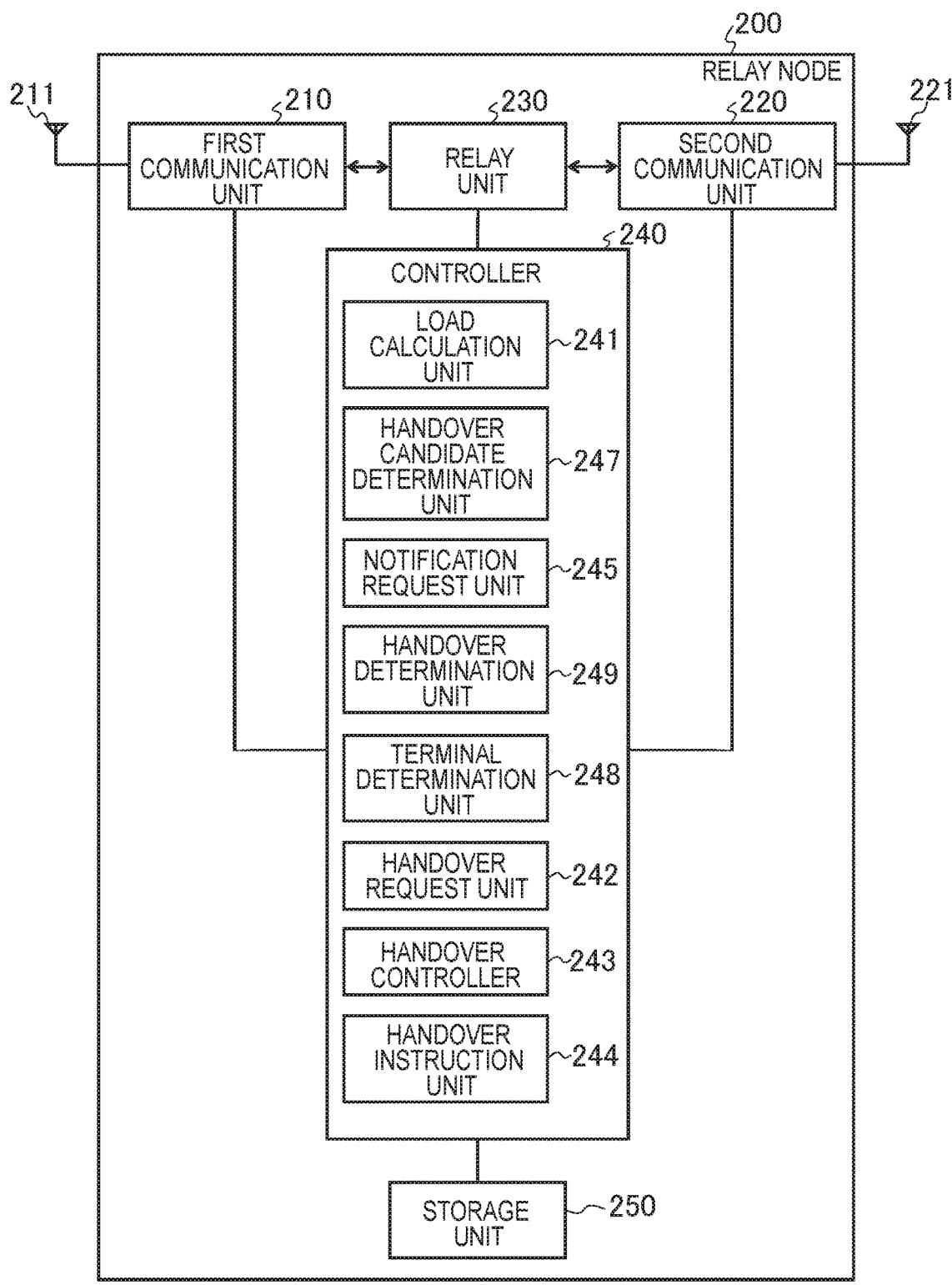
FIG. 10 is a block diagram showing a configuration of a relay node according to a fourth embodiment.

FIG. 10 is a block diagram showing a configuration of a relay node 200 according to a fourth embodiment.

As shown in FIG. 10, the relay node 200 according to the fourth embodiment has a controller 240 with a configuration different from that of the controller 240 in the first to third embodiments. The controller 240 has a load calculation unit 241, a handover candidate determination unit 247, a notification request unit 245, a handover determination unit 249, a terminal determination unit 248, a handover request unit 242, a handover controller 243, and a handover instruction unit 244. Here, the description is briefly given to portions different from those of the third embodiment.

The handover determination unit 249 calculates a load of a relay handover candidate that the relay handover candidate may have if a relay handover to the relay handover candidate is executed based on a load notification and a relay node load, and determines whether or not to execute the relay handover based on the calculated load. The handover request unit 242 controls the first communication unit 210 so that the first communication unit 210 can transmit a relay handover request when it is determined that the relay handover is to be executed.

When it is determined that the relay handover is not to be executed, based on a relay node load and a terminal load which is a load for each radio terminal, the terminal determination unit 248 determines at least one radio terminal to be caused to perform the terminal handover so as to keep the relay node load equal to or smaller than a load allowable amount.

(4.2) Operation of Radio Communication System

Hereinafter, an operation of a radio communication system 1 according to the fourth embodiment is described in the order of (4.2.1) Entire Operation, (4.2.2) Handover Candidate Determination Processing, and (4.2.3) Handover Destination Determination Processing.

(4.2.1) Entire Operation

Figure 11:
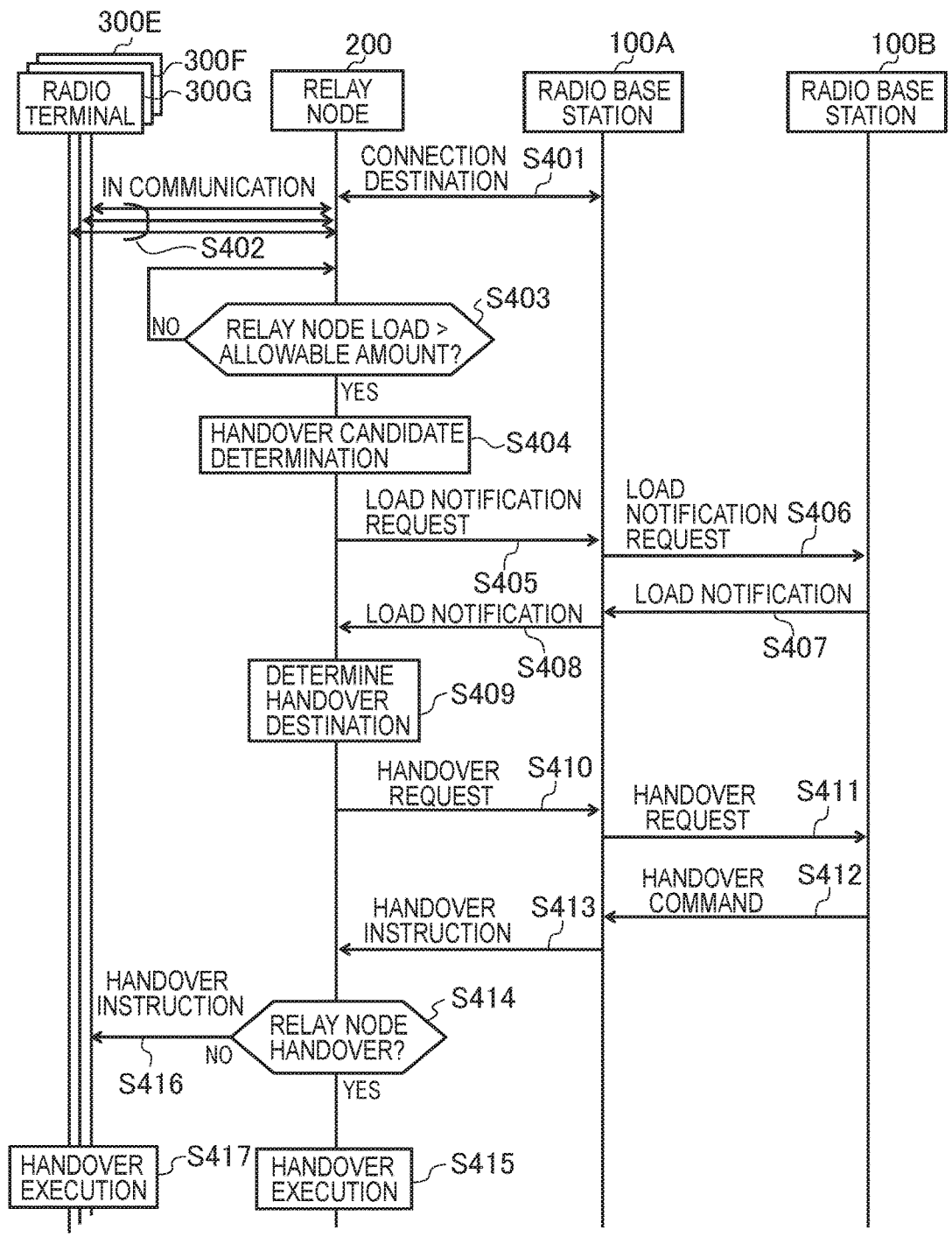
FIG. 11 is a sequence diagram showing an entire operation of a radio communication system according to the fourth embodiment.

FIG. 11 is a sequence diagram showing an entire operation of the radio communication system 1 according to the fourth embodiment.

Steps S401 to S403 are similar to those of the above-described embodiments.

At step S404, the handover candidate determination unit 247 of the relay node 200 determines a handover candidate. Here, it is assumed that the radio base station 100B is determined as a handover candidate. The details of step S404 are described later.

At step S405, the notification request unit 245 of the relay node 200 controls the first communication unit 210 so that the first communication unit 210 can transmit a load notification request for requesting a load notification notifying a load of the handover candidate. The first communication unit 210 transmits the load notification request to the radio base station 100A. The radio base station 100A receives the load notification request via a radio link.

At step S406, the radio base station 100A transmits the load notification request to the radio base station 100B based on identification information contained in the received load notification request. The radio base station 100B receives the load notification request via an X2 interface.

At step S407, the radio base station 100B transmits the load notification notifying the load of the radio base station 100B to the radio base station 100A. The radio base station 100A receives the load notification via the X2 interface.

At step S408, the radio base station 100A transmits the load notification to the relay node 200. The first communication unit 210 of the relay node 200 receives the load notification via the radio link.

At step S409, the handover determination unit 249 of the relay node 200, the handover target determination unit 246, and the terminal determination unit 248 determine a node (a radio terminal or a relay node) supposed to perform handover among the relay node 200 and the radio terminals 300 under the relay node 200, and determine a handover target. Here, it is assumed that the radio base station 100B is determined as a handover target. The details of step S409 are described later.

At step S410, the handover request unit 242 of the relay node 200 controls the first communication unit 210 so that the first communication unit 210 can transmit a handover request toward the determined handover target. The first communication unit 210 transmits the handover request to the radio base station 100A. The radio base station 100A receives the handover request via the radio link.

At step S411, the radio base station 100A transmits the handover request to the radio base station 100B based on identification information of the handover target, which is contained in the received handover request. The radio base station 100B receives the handover request via the X2 interface.

At step S412, the radio base station 100B transmits a handover command to accept the handover to the radio base station 100A. The radio base station 100A receives the handover command via the X2 interface.

At step S413, the radio base station 100A transmits a handover command to the relay node 200. The first communication unit 210 of the relay node 200 receives the handover command via the radio link.

When the handover instruction received by the first communication unit 210 of the relay node 200 is a handover instruction to the relay node 200 (Step S414; YES), at step S415, the handover controller 243 of the relay node 200 controls the first communication unit 210 so that the first communication unit 210 can perform the relay handover from the radio base station 100A to the radio base station 100B according to the handover instruction.

When the handover instruction received by the first communication unit 210 is a handover instruction to the radio terminal 300 under the relay node 200 (step S414; NO), at step S416, the handover instruction unit 244 of the relay node 200 controls the second communication unit 220 so that the second communication unit 220 can transmit a handover instruction to the appropriate radio terminal. The second communication unit 220 transmits the handover instruction. The radio terminal 300 under the relay node 200, which received the handover instruction, executes the terminal handover from the radio base station 100A to the radio base station 100B.

(4.2.2) Handover Candidate Determination Processing

Figure 12:
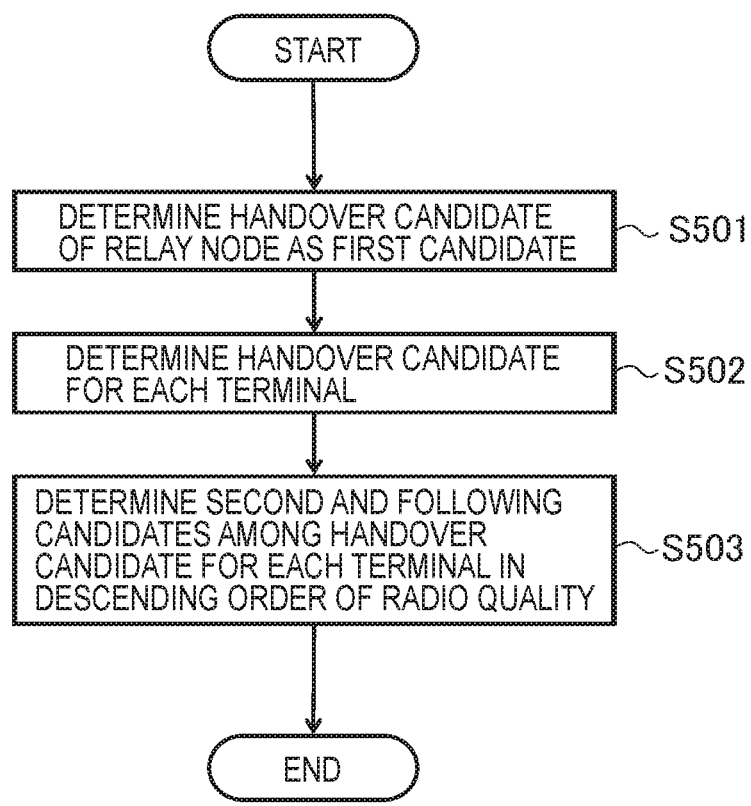
FIG. 12 is a flowchart showing the detail of step S404 in FIG. 11.

Hereinafter, handover candidate determination processing, i.e., step S404 of FIG. 11 is described in detail. FIG. 12 is a flowchart showing the details of step S404 of FIG. 11.

The first communication unit 210 of the relay node 200 measures a radio quality of a received radio signal and notifies the handover candidate determination unit 247 of the measured result. At step S501, the handover candidate determination unit 247 determines one whose radio quality is the best as a first candidate of the handover candidate (a relay handover candidate) among the radio base stations other than the radio base station 100A. However, when a radio quality of the radio base stations other than the radio base station 100A cannot be measured, or even though the measurement can be made but when the measured quality is equal to or lower than a predetermined quality, it is assumed that there is no first candidate.

The second communication unit 220 of the relay node 200 regularly receives a measurement result notification indicating a measurement result of the radio quality of the radio signal which is received by the radio terminal 300 under the relay node 200 from the radio terminal 300 under the relay node 200. At step S502, the handover candidate determination unit 247 determines a handover candidate of each radio terminal 300 under the relay node 200 based on the measurement result notification received by the second communication unit 220. Specifically, a radio base station whose radio quality is the best for each radio terminal 300 under the relay node 200 is determined as a handover candidate. When the radio quality of the radio base station cannot be measured, or even through the measurement can be made but when the measured quality is equal to or lower than a predetermined quality, it is assumed that there is no handover candidate for the radio terminal.

At step S503, the handover candidate determination unit 247 gives priority to a second candidate, a third candidate, . . . an n-th candidate in descending order of radio quality among the handover candidates listed at step S502.

By the processing at step S501 to step S503, the first candidate to the n-th candidate are determined.

(4.2.3) Handover Destination Determination Processing

Figure 13:
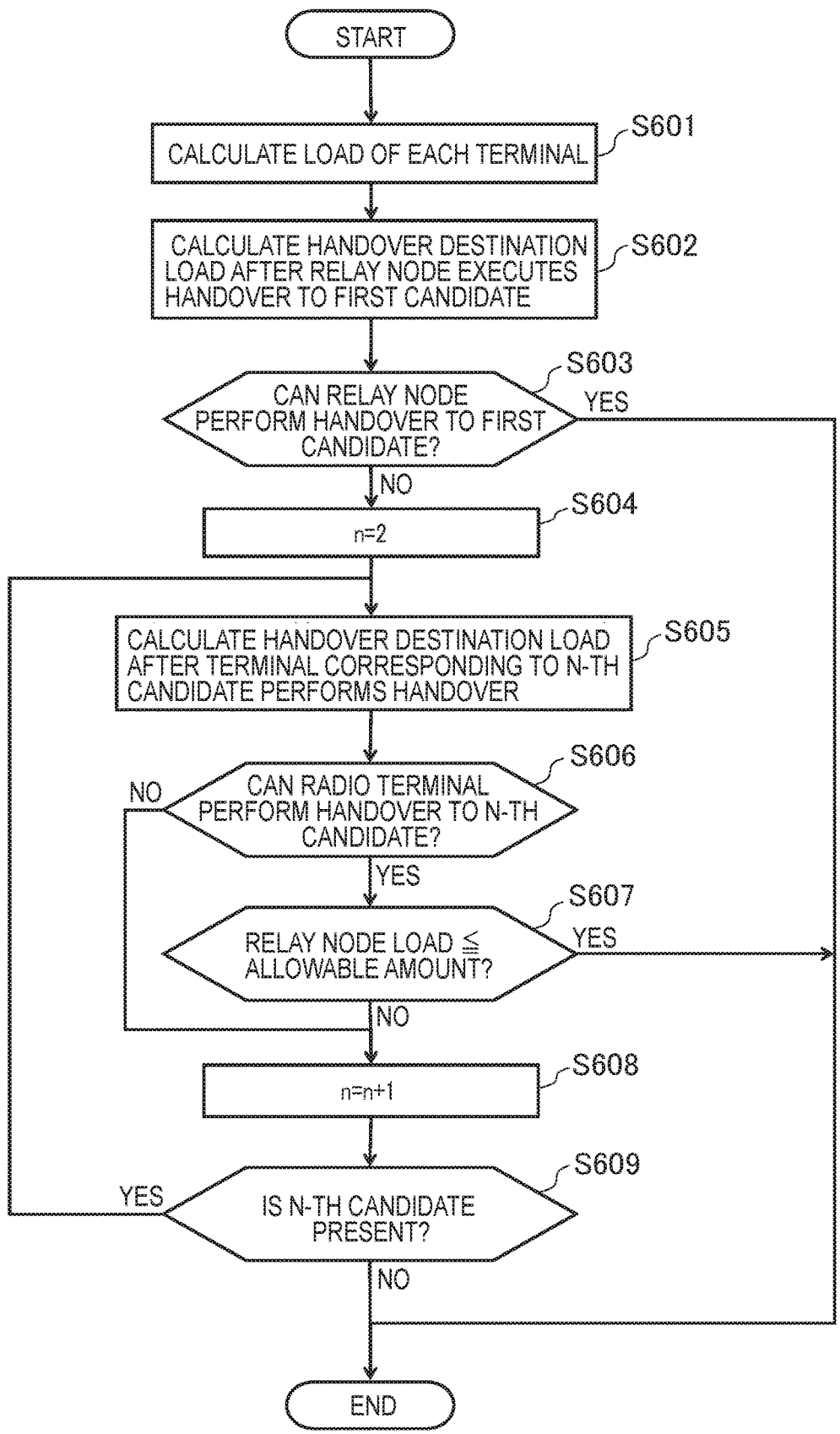
FIG. 13 is a flowchart showing the detail of step S409 of FIG. 11.

Hereinafter, handover destination determination processing, i.e., step S409 of FIG. 11 is described in detail. FIG. 13 is a flowchart showing the details of step S409.

At step S601, the load calculation unit 241 calculates a load (a terminal load) of each radio terminal 300 under the relay node 200.

At step S602, the load calculation unit 241 and the handover determination unit 249 calculate a load of the first candidate that the first candidate may have if the relay node 200 executes the handover to the first candidate based on the load of the first candidate corresponding to the load notification received at step S408 and the relay node load.

At step S603, the handover determination unit 249 determines whether the relay node 200 can execute the handover to the first candidate based on the load of the handover target, calculated at step S602. For example, the handover determination unit 249 determines that the handover can be executed when the load of the first candidate is equal to or smaller than a predetermined value, and, in other cases, determines that the handover cannot be executed.

When it is determined that the handover to the first candidate can be executed, the handover target determination unit 246 determines the first candidate as a handover target of the relay node 200. When it is determined that the handover to the first candidate cannot be executed, the handover of the relay node 200 is gave up and determination of handover for each radio terminal 300 under the relay node 200 is performed after step S604.

At step S605, the n showing a candidate is set to 2.

At step S606, the load calculation unit 241 and the handover determination unit 249 calculate a load of the n-th candidate that the n-th candidate may have if the radio terminal corresponding to the n-th candidate performs handover to the n-th candidate based on the terminal load of the radio terminal corresponding to the n-th candidate (here the second candidate) and the load of the n-th candidate corresponding to the load notification received at step S408.

At step S606, the handover determination unit 249 determines whether the radio terminal corresponding to the n-th candidate can execute the handover to the n-th candidate based on the load of the n-th candidate calculated at step S656. For example, the handover controller 132 determines that the handover is possible when the calculated load of the n-th candidate is equal to or smaller than a predetermined value, and, in other cases, determines that the handover is impossible. When it is determined that the handover to the n-th candidate is possible, the handover target determination unit 246 determines the n-th candidate as the handover target of the radio terminal.

At step S607, the radio terminal performs handover to the handover target (the n-th candidate), so that the terminal determination unit 248 determines whether the relay node load of the relay node 200 becomes equal to or smaller than a predetermined value. When the relay node load becomes equal to or smaller than a predetermined value, the terminal determination unit 248 determines the radio terminal as a node to be caused to execute handover, and the handover target determination unit 246 determines the n-th candidate as the handover target, and terminates the processing.

On the other hand, when it is determined that the handover to the n-th candidate is impossible, the handover determination unit 249 sets n=n+1 at step S608, and proceeds to determination processing for a next candidate.

At step S609, it is determined that processing for all the candidates has been completed, and when there is a candidate whose processing has not been completed, the step returns to step S605.

When the processing for all the candidates has been completed (step S609; NO) and when the handover target has been determined by the processing so far, the terminal determination unit 248 determines the radio terminal corresponding to the determined handover target as a node to be caused to perform the handover. When the processing for all the candidates has been completed (step S609; NO) and when a handover target has not been determined by the processing so far, the processing is terminated as there is no handover target.

Note that if the processing is finished with YES at step S607, the load of the relay node 200 is equal to or smaller than a predetermined value, while if the processing is finished with NO at step S607, the load of the relay node 200 is not equal to or smaller than a predetermined value. When the load of the relay node 200 is lowered by changing the radio terminal 300 under the relay node 200 to the terminal handover candidate, the relay node 200 may be changed to the relay handover candidate.

(4.3) Effects of Fourth Embodiment

As described above, according to the fourth embodiment, the relay node 200 can calculate a load of the relay handover candidate after the relay handover in advance, and executes a relay handover if the calculated load is about an allowable level and does not execute the relay handover if the load after the relay handover is not an allowable level.

The relay handover results in rapidly increasing the load in the handover target. Accordingly, the relay node 200 does not execute the relay handover to the radio base station 100B under the circumstance where the load of the radio base station 100B is high, but executes the terminal handover for each radio terminal 300 under the relay node 200.

At that time, the relay node 200 causes at least one radio terminal to perform handover among the radio terminals 300 under the relay node 200. Accordingly, a radio terminal to be caused to perform handover can be determined so that the balance between the load of the relay node 200 and the load of the handover target becomes optimum after the terminal handover.

(5) Other Embodiments

As described above, the present invention has been described according to the embodiments. However, it should not be understood that discussion and drawing which constitute one part of this disclosure limit the invention. Various alternative embodiments, examples, operational techniques will be apparent for those who are in the art from this disclosure. For example, the first to fourth and other embodiments may be implemented in combination with one another.

Hereinafter, modifications of the above-described embodiments are described.

(5.1) Modification 1

In the above-described embodiments, at steps S103, S203, S303, and S403, the determined if the relay node load exceeds the load allowable amount is made. However, instead of the determination, the following determination may be made.

For example, when a relay node load rapidly increases, even before the relay node load exceeds the load allowable amount, it is predicted that the relay node load would exceed the load allowable amount, and the processing may proceed to processing of a handover request, a load notification request, or the like. For example, when an increased amount of the relay node load per unit time exceeds a predetermined increased amount, it can be predicted that the relay node load would exceed the load allowable amount. With this method, the handover processing according to the above-described embodiments can be started earlier.

Alternatively, the following method can be adopted as a method of predicting that a relay node load exceeds a load allowable amount. Data which is received by relay node 200 from the first communication unit 210 is once stored in the storage unit 250 as a transmission buffer before being transmitted from the second communication unit 220. However, when an availability of radio resources of the second communication unit 220 is small and an amount of data which can be transmitted/received by the second communication unit 220 is small, the data is stored in the storage unit 250 as a transmission buffer. For this reason, it may be predicted that the relay node load would exceed the load allowable amount based on a predicted criteria that the data accumulated amount of the transmission buffer exceeds a predetermined amount.

(5.2) Modification 2

In the above-described second to fourth embodiments, the processing relating to the terminal handover is performed in consideration of a load and radio quality of each radio terminal 300 under the relay node 200. However, the processing relating to the terminal handover may be performed in further consideration of a remaining battery level of each radio terminal 300 under the relay node 200.

Specifically, the second communication unit 220 receives a battery notification indicating a remaining battery level of the radio terminal 300 under the relay node 200 for each radio terminal. The terminal determination unit 248 preferentially determines a radio terminal with a higher remaining battery level as a radio terminal to be caused to execute the terminal handover based on the battery notification received by the second communication unit 220.

For example, at step S503 of FIG. 12, the terminal determination unit 248 may give priority to the handover candidates based on the remaining battery level. The radio terminal 300 with a lower remaining battery level requires smaller transmission power when it is connected to the relay node 200 closer than the radio base station 100A. Thus, this can result in the battery saving of the radio terminal 300 with a lower remaining battery level.

(5.3) Modification 3

In the above-described embodiments, the relay node 200 is described as a fixed type of relay node. However, it may be configured to be movable. Also, in the above-described embodiments, a handover candidate or a handover target is determined in consideration of a radio quality of the relay node 200. However, with regard to the fixed type of relay node 200, a handover candidate or a handover target may be determined in advance.

(5.4) Modification 4

In the above-described embodiments, the case where the relay node 200 and the radio terminal 300 under the relay node 200 perform a handover to an adjacent base station (the radio base station 100B) is illustrated. However, the handover target of the relay node 200 and the radio terminal 300 under the relay node 200 is not limited to a radio base station but may be a relay node. When the relay node 200 performs a handover to another relay node, the first communication unit 210 of the relay node 200 performs communications with the other relay node regarding the other relay node as a connection destination.

(5.5) Modification 5

In the above-described embodiments, the case where the relay node 200 receives a handover instruction from the radio base station 100A is illustrated. However, instead of such a forceful handover instruction, a message indicating the allowance of the handover may be used.

It should be understood that the present invention includes various embodiments which are not described herein. Accordingly, the present invention is only limited by the scope of claims and matters specifying the invention, which are appropriate from this disclosure.

Note that the contents of Japan Patent Application No. 2010-14693 (filed on Jan. 26, 2010) and Japan Patent Application No. 2010-14696 (filed on Jan. 26, 2010) are hereby incorporated by reference in their entirety.

INDUSTRIAL APPLICABILITY

As described above, a radio relay station and a control method according to the present invention can improve a throughput of a radio terminal by performing proper load balancing. Thus, the present invention is useful in a radio communication such as a mobile communication.

The invention claimed is:

1. A radio relay station that communicates with a first radio base station as a connection destination, communicates with at least one radio terminal, and thereby relays data to be exchanged between the first radio base station and the radio terminal, comprising:
 a controller configured to:
 transmit, to the first radio base station, load notification request requesting a notification of a load of a second radio base station, wherein the load indicates a load of connection of the second radio base station;
 control a handover of the radio terminal based on the load of the second radio base station notified by the first radio base station, without changing the connection destination of the radio relay station;
 transmit, to the first radio base station, a handover request for executing the handover of the radio terminal to the second radio base station;
 receive, from the first radio base station, a response message indicating that the handover request is allowed; and
 instruct, to the radio terminal, the handover to the second radio base station in response to receiving the response message indicating that the handover request is allowed, wherein
 the load notification request includes identifier of cell of the second radio base station, and
 the handover request includes the identifier of the cell of the second radio base station.

2. A control method of a radio relay station that communicates with a first radio base station as a connection destination, communicates with at least one radio terminal, and thereby relays data to be exchanged between the first radio base station and the radio terminal, comprising:
 transmitting, to the first radio base station, load notification request requesting a notification of a load of a second radio base station, wherein the load indicates a load of connection of the second radio base station;
 controlling a handover of the radio terminal based on the load of the second radio base station notified by the first radio base station, without changing the connection destination of the radio relay station;
 transmitting, to the first radio base station, a handover request for executing the handover of the radio terminal to the second radio base station;
 receiving, from the first radio base station, a response message indicating that the handover request is allowed; and
 instructing, to the radio terminal, the handover to the second radio base station in response to receiving the response message indicating that the handover request is allowed, wherein
 the load notification request includes identifier of cell of the second radio base station, and
 the handover request includes the identifier of the cell of the second radio base station.

* * * * *